United States Patent
Koishi et al.

(10) Patent No.: US 6,970,627 B2
(45) Date of Patent: Nov. 29, 2005

(54) METHOD AND APPARATUS FOR CORE ALIGNMENT BETWEEN OPTICAL COMPONENTS

(75) Inventors: Musubu Koishi, Hamamatsu (JP); Shingo Minamino, Hamamatsu (JP)

(73) Assignee: SOEI Patents, Trademark & Law, Tokyo (JP)

(*) Notice: Subject to any disclaimer, the term of this patent is extended or adjusted under 35 U.S.C. 154(b) by 216 days.

(21) Appl. No.: 10/437,407

(22) Filed: May 13, 2003

(65) Prior Publication Data

US 2004/0008339 A1 Jan. 15, 2004

(30) Foreign Application Priority Data

May 14, 2002 (JP) .................................... P2002-139011

(51) Int. Cl.[7] ............................................. G02B 6/26
(52) U.S. Cl. ............................. 385/52; 385/25; 385/15
(58) Field of Search .................................... 385/15–52

(56) References Cited

U.S. PATENT DOCUMENTS

| | | | | |
|---|---|---|---|---|
| 4,452,506 A | * | 6/1984 | Reeve et al. | 385/52 |
| 4,474,423 A | * | 10/1984 | Bisbee et al. | 385/52 |
| 4,929,045 A | * | 5/1990 | Fuller | 385/33 |
| 6,205,266 B1 | * | 3/2001 | Palen et al. | 385/15 |

FOREIGN PATENT DOCUMENTS

JP 6-265759 9/1994 .............. G02B/6/42

OTHER PUBLICATIONS

Patent Abstracts of Japan, Publication No. 06–265759 dated Sep. 22, 1994 (1 pg.).

* cited by examiner

*Primary Examiner*—Sung Pak
(74) *Attorney, Agent, or Firm*—Osha Liang LLP

(57) ABSTRACT

Light emitted from a light source module and introduced to an optical fiber is detected with a photodetector. An amplification unit amplifies an output from the photodetector. Using a piezoactuator, the light source module is subjected to reciprocal scanning by repeating one-dimensionally in the X axis direction. In this way, one-dimensional optical intensity distribution in the X-axis direction is obtained based on an output of an amplification unit obtained in accordance with the reciprocal scanning. Based on the one-dimensional optical intensity distribution in the X-axis direction, relative positions between the light source module and the optical fiber are adjusted.

20 Claims, 16 Drawing Sheets

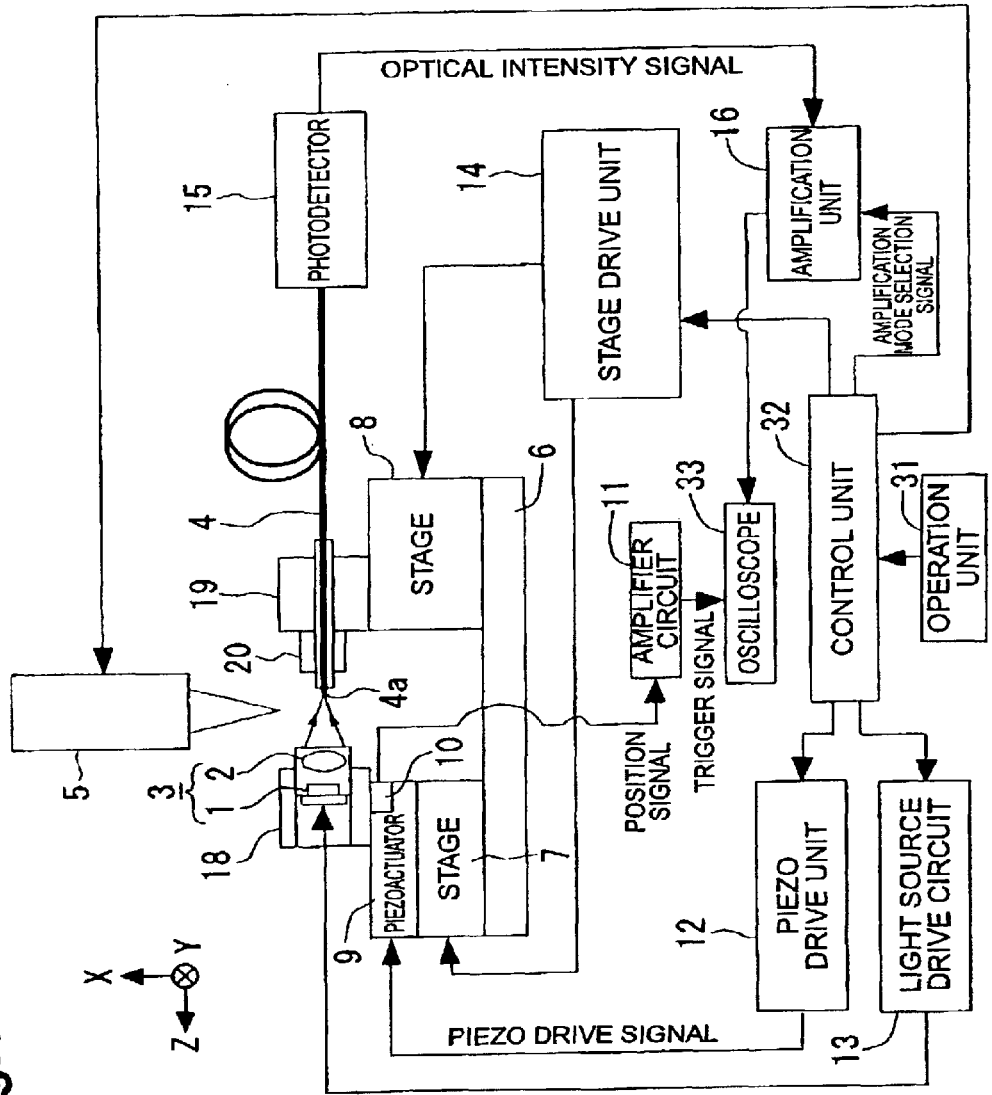

METHOD AND APPARATUS FOR CORE ALIGNMENT BETWEEN OPTICAL COMPONENTS

BACKGROUND OF THE INVENTION

1. Field of the Invention

The present invention relates to a method and an apparatus for core alignment between optical components to align a pair of optical components (including discrete components and so-called optical modules being composed of a plurality of components).

2. Related Background Art

In general, high precision is required for alignment between a pair of optical components.

For example, a core diameter of a single-mode optical fiber for use in optical communications is in a range from about 3 to 8 $\mu m \phi$. Meanwhile, focus spot sizes of a semiconductor laser which is a light source and of a condenser lens are also extremely small that the diameter is several micrometers. Accordingly, high precision is required for the core alignment between these optical components. Usually, when light from a semiconductor laser is optically coupled to a single-mode optical fiber, margins of errors to suppress a coupling loss down to −0.5 dB or thereabout are: approximately ±1 $\mu m$ in a perpendicular direction to an optical axis; approximately ±10 $\mu m$ in a horizontal direction; and approximately ±0.5° in terms of angular deviation.

In the meantime, the same degree of precision is also required for the core alignments between a semiconductor laser and a waveguide and between an optical fiber and a waveguide.

Conventionally, the core alignment of optical components has been performed as follows: detecting light emitted from a first optical component and introduced to a second optical component with a photodetector; amplifying an output of this photodetector with amplification means; and adjusting relative positions between the first and second optical components based on the output of the amplification means. Various methods of the core alignment, which include the technologies described later, have been proposed. However, a linear amplifier is used as the amplification means for any of the conventional methods of the core alignment.

In a typical conventional method of the core alignment, a tip of an optical fiber is scanned relative to a focus spot of a semiconductor laser by use of an XYZ stage to serially trace a position of a stronger signal. As a method for achieving such a scan in a short period of time, there is a typical method including the steps of: performing spiral scanning to detect a range where given signal intensity is obtained; and finding an optimum point after detection of the range by stepwise two-dimensional or three-dimensional scanning called a hill-climbing method.

Meanwhile, Japanese Patent Application Laid-Open No. 6-265759 (Japanese Patent Publication No.7(1995)-113694) discloses an automatic optical axis alignment apparatus for automatically aligning a pair of optical fibers by: circulating a tip of an optical fiber by use of a piezoactuator designed to scan along a direction displaced by 90°; and detecting a shift of an optical axis in terms of two X and Y directions by phase detection.

SUMMARY OF THE INVENTION

However, the conventional technologies using both spiral scanning and the hill-climbing method have a problem that a time period in a range from 40 seconds to several minutes is required for searching because (a) a time period for several tens of seconds is required for detecting the range where the given signal intensity is obtained by spiral scanning, and (b) the hill-climbing method is conducted while judging an increase or a decrease in the signal in each step of scanning.

Moreover, optical intensity distribution does not always have an ideal gradient. In other words, there may be a spot where the gradient of optical intensity is locally reversed. For example, when light from a semiconductor laser is focused with a lens, optical intensity distribution does not generally constitute ideal Gaussian distribution because of distortion of a beam from the semiconductor laser, aberration or interference of the lens, and the like. Instead, actual optical intensity distribution may frequently fluctuate locally relative to the foregoing distribution. Such a tendency is apt to occur typically in a region of low optical intensity which is distant from a focal spot. Therefore, a peak point cannot be determined by a method of tracing the strongest point of the signal, such as the conventional methods represented by the hill-climbing method. This incapability of determination has been a cause of increasing the time period for the core alignment.

Furthermore, the conventional technologies employing both spiral scanning and the hill-climbing method detects the range where the given signal intensity is obtained by use of the signal that is processed by amplifying the output of the photodetector with the linear amplifier. Accordingly, the range of optical intensity monitorable by the signal amplified with the linear amplifier is extremely limited. Therefore, a long time period has been required for detecting the range where the given signal intensity was obtained.

The conventional technology disclosed in Japanese Patent Publication No. 7(1995)-113694 performs phase detection of the output of the photodetector while using a drive signal of the piezoactuator as a reference signal, thereby detecting the shift of the optical axis in terms of two directions X and Y. However, since the linear amplifier is employed, XY-axis scanning takes time for obtaining the signal intensity at a sufficient level for the phase detection with a lock-in amplifier. Moreover, the conventional technology disclosed in the Japanese Patent Publication No. 7(1995)-113694 only attains alignment merely in the XY-axis direction (the in-plane direction orthogonal to the optical axis), and therefore does not contribute to alignment along the direction of the optical axis. Hence, for example, in the case of alignment between a light source module composed of a semiconductor laser and a condenser lens, and an optical fiber, it is impossible to adjust a direction of a focal spot (a Z axis) promptly.

The present invention has been made by taking account of the foregoing problems. It is an object of the present invention to provide a method and an apparatus for core alignment between optical components, which are capable of performing prompt alignment between the optical components.

As a result of researches and studies, the inventors of the present invention discovered, by carefully investigating three-dimensional optical intensity distribution when performing the core alignment between optical components, that one-dimensional optical intensity distribution in the three-dimensional space contains extremely useful information which can be used for prompt alignment between the optical components while minimizing conventionally requisite searching operations. Moreover, the inventors discovered, by carefully investigating the three-dimensional optical intensity distribution when performing the core alignment between optical components, that the use of a logarithmic amplifier as amplification means for amplifying an output of a photodetector is most suitable for expanding the three-dimensional space where the optical intensity can be monitored as a signal in response to a distribution characteristic thereof. If it is possible to expand the three-dimensional space where the optical intensity can be monitored as a signal, the time period for the core alignment can be remarkably shortened than before in combination with any conventional core alignment technologies. Furthermore, especially when the use of a logarithmic amplifier and the obtainment and use of the one-dimensional optical intensity distribution are adopted simultaneously, effects of adaptation of the two technologies are exerted synergically, whereby the time period for the core alignment can be considerably shortened than before.

The present invention has been achieved as a consequence of the researches and studies by the inventors as described above.

A method for core alignment between optical components according to the present invention is a method for core alignment between optical components for adjusting relative positions between first and second optical components. Herein, amplification means is used for amplifying an output of a photodetector configured to detect light being emitted from the first optical component and introduced to the second optical component. Moreover, the method includes: an optical intensity distribution obtaining step of subjecting said first and second optical components relatively to reciprocal scanning by repeating one-dimensionally concerning one axis and obtaining one-dimensional optical intensity distribution of the one axis based on the output of the amplification means obtained in accordance with the reciprocal scanning; and a position adjusting step of adjusting the relative positions between the first and second optical components based on the one-dimensional optical intensity distribution obtained in the optical intensity distribution obtaining step.

In the method for core alignment between optical components according to the present invention, the one-dimensional optical intensity distribution of the one axis is obtained relatively by subjecting the first and second optical components to reciprocal scanning by repeating one-dimensionally concerning the one axis, and the relative positions between the first and second optical components are adjusted based on this optical intensity distribution. In this way, position adjustment is performed by utilizing the one-dimensional optical intensity distribution in a lump unlike the conventional technologies. Accordingly, it is possible to reduce redundant operations for searching signals and to perform prompt alignment between the optical components. Moreover, since the position adjustment is performed by utilizing the one-dimensional optical intensity distribution in a lump, it is possible to reduce adverse affects considerably, which are attributable to failure of the optical intensity distribution to form ideal Gaussian distribution and resultant local fluctuation in actual optical intensity distribution relative to the foregoing distribution.

Moreover, in the present invention, it is preferable to allow the amplification means to perform logarithmic amplification. In this case, since the output of the photodetector is logarithmically amplified, it is possible to considerably expand a three-dimensional space where the optical intensity can be monitored as a signal. For example, it is possible to detect a change in signal intensity ranging in six digits in real time without gain switching. Accordingly, it is possible to conduct adjustment relative to a three-dimensional shift between a focal spot and an incident point while monitoring signal intensity in a wider space, which is three or more times larger in area in terms of the respective axes and about thirty times larger in volume as compared with the case of using linear amplification. In this way, it is possible to considerably expand the space capable of effectively obtaining the one-dimensional optical intensity distribution by using the logarithmic amplification in addition to the use of the one-dimensional optical intensity distribution. Accordingly, the effects of the both technologies are exerted synergically and effectuate further reduction in the time for the core alignment.

Meanwhile, in the present invention, it is preferable that the amplification means is allowed to perform logarithmic amplification before the relative position approaches a core alignment position, and that the amplification means is allowed to perform linear amplification after the relative position has approached the core alignment position. In this case, a signal based on the logarithmic amplification is used before approaching the core alignment position, and a signal based on the linear amplification is used after approaching the core alignment position. Accordingly, it is possible to further enhance precision in the core alignment by using the linear amplification which facilitates detection of a signal change in a narrower range in the vicinity of the core alignment position as well as gaining an advantage of performing the logarithmic amplification.

Meanwhile, in the present invention, it is preferable that the position adjusting step further includes the steps of: obtaining any of an integral value and an average value in a given range of the optical intensity from the one-dimensional optical intensity distribution; moving a central position of the reciprocal scanning to a given direction being approximately perpendicular to an optical axis of the light emitted from the first optical component; and stopping movement to the given direction at any of a position where any one of the integral value and the average value becomes the maximum and a position in the vicinity thereof. In this case, the integral value or the average value of optical intensity is obtained from the one-dimensional optical intensity distribution and is used. Accordingly, it is possible to approximate the relative position of the optical component to the core alignment position in terms of the given direction even if there is not the core alignment position within the range of the reciprocal scanning. Moreover, since the integral value or the average value is used therein, it is possible to considerably reduce adverse affects, which are attributable to failure of the optical intensity distribution to form ideal Gaussian distribution and to resultant local fluctuation in actual optical intensity distribution relative to the foregoing distribution. Note that the given direction of moving the central position of the reciprocal scanning and the direction of the reciprocal scanning may agree or disagree.

Meanwhile, in the present invention, it is preferable that the position adjusting step further includes the steps of: obtaining any of a peak value and a given ratio width of the optical intensity from the one-dimensional optical intensity distribution; moving a central position of the reciprocal scanning to a given direction; and stopping movement to the given direction at any of a position of any one of a point where the peak value becomes the maximum and a point in the vicinity thereof, and a position of any one of a point where the given ratio width becomes the minimum and a point in the vicinity thereof. In this case, adjustment in the given direction is performed based on the peak value or the given ratio width. Accordingly, it is particularly effective for fine adjustment when the relative positions of the first and the second optical components approach the core alignment position.

Herein, the given ratio width is a width of a one-dimensional optical intensity distribution waveform at a level declined by the given ratio from the peak value. If 50% is adopted as the ratio, the given ratio width is equal to a half width. Note that the ratio is not limited to 50%, and any appropriate values such as 40% and 60% are applicable thereto. Moreover, the given direction of moving the central position of the reciprocal scanning and the direction of the reciprocal scanning may agree or disagree. For example, the given direction may be the direction approximately coinciding with a direction of an optical axis of the light emitted from the first optical component, or may be an approximately perpendicular direction to the foregoing direction.

Incidentally, as a result of researches by the inventors, it has been clarified that if the central position of the reciprocal scanning is moved to a direction approximately coincident with the direction of the optical axis while offsetting the central position of the reciprocal scanning to the perpendicular direction to the direction of the optical axis, the central position becomes closest to the core alignment position where any of the integral value, the average value, and the peak value of the optical intensity becomes the minimum.

Accordingly, in the present invention, it is preferable that the light emitted from the first optical component is light to be focused on a focal spot, and that the position adjusting step further includes the steps of: obtaining any one of an integral value, an average value, and a peak value of optical intensity from the one-dimensional optical intensity distribution; and moving a central position of the reciprocal scanning to a first direction while offsetting the central position to a second direction being approximately perpendicular to the first direction approximately coincident with a direction of an optical axis of the light emitted from the first optical component and stopping the movement to the first direction at any of a position where any one of the integral value, the average value, and the peak value becomes the minimum and a position in the vicinity thereof. Herein, the direction the reciprocal scanning may agree or disagree with the first direction or the second direction.

Meanwhile, in the present invention, it is preferable that the position adjusting step further includes the steps of: obtaining any of a peak value and a given ratio width of the optical intensity from the one-dimensional optical intensity distribution; moving a central position of the reciprocal scanning to a given direction approximately perpendicular to a direction of an optical axis of the light emitted from the first optical component; and stopping the movement to the given direction at any of a position where any one of the peak value and the given ratio width becomes a given value and a position in the vicinity thereof.

For example, a point where an emitting end and an incident end coincide becomes an ideal core alignment position for the core alignments between a waveguide and an optical fiber or between a waveguide and a semiconductor laser. However, if the emitting end and the incident end contact with each other upon adjustment, an end face of the component may be scratched, and the core alignment may be deviated. Therefore, it is necessary to stop the movement of the optical component to the direction of the optical axis when a gap between the emitting end and the incident end reaches a given amount at a final stage of the core alignment. Conventionally, there is an example of measuring such a gap by optical means from the perpendicular direction to the optical axis. However, such measurement is not easy if this gap is several micrometers, because of adverse effects such as interference or structural distortion in the perpendicular direction to the gap. On the contrary, as a result of researches and studies, the inventors discovered that the peak value and the given ratio width is in correlation with the gap. Accordingly, it is possible to set the gap with high precision without using a particular gap measuring means by stopping the movement of the optical component to the direction of the optical axis at the position where the peak value or the given ratio width reaches the given value, in other words, when the gap reaches the given amount.

For example, in the case of performing the core alignment between a ribbon fiber and a waveguide device having a plurality of waveguide end portions arranged linearly on an end face, it is necessary to match inclinations of both of the components around the optical axis. The inventors discovered that it is also possible to adjust such inclinations around the optical axis based on the one-dimensional optical intensity distribution.

Accordingly, a method for core alignment between optical components according to the present invention is a method for core alignment between optical components for adjusting relative positions between first and second optical components. Herein, the first optical component includes a plurality of regions being arranged on an approximately straight line and capable of respectively emitting light mutually parallel along an optical axis, and the second optical component includes a plurality of regions being arranged on an approximately straight line and capable of respectively allowing light to be incident. Moreover, at least two pieces of amplification means are used for amplifying outputs corresponding to at least two photodetectors for respectively detecting light being respectively emitted from at least two corresponding regions from the plurality of regions of the first optical component and respectively introduced to at least two corresponding regions from the plurality of regions of the second optical component. Herein, the method includes: an optical intensity distribution obtaining step of subjecting the first and second optical components relatively to reciprocal scanning by repeating one-dimensionally concerning one axis and obtaining the one-dimensional optical intensity distribution concerning the one axis for each output respectively based on each of the outputs of at least the two pieces the amplification means obtained in accordance with the reciprocal scanning; and a position adjusting step of adjusting the relative positions between the first and second optical components based on the respective pieces of the one-dimensional optical intensity distribution obtained in the optical intensity distribution obtaining step so as to reduce a variation of peak positions of the respective pieces of the one-dimensional optical intensity distribution.

In the method for core alignment between optical components according to the present invention, it is possible to perform prompt adjustment of the relative positions between the first optical component having the plurality of regions being arranged on the approximately straight line and capable of respectively emitting light mutually parallel along the optical axis, and the second optical component having the plurality of regions being arranged on the approximately straight line and capable of respectively allowing the light to be incident.

A method for core alignment between optical components according to the present invention is a method for core alignment between optical components for adjusting relative positions between first and second optical components. Herein, amplification means is used for amplifying an output of a photodetector configured to detect light being emitted from the first optical component and introduced to the second optical component. Moreover, the method includes the step of allowing the amplification means to perform logarithmic amplification.

In the method for core alignment between optical components according to the present invention, since the output of the photodetector is logarithmically amplified, it is possible to considerably expand a three-dimensional space where optical intensity can be monitored as a signal. Therefore, it is possible to considerably shorten a time period for searching a region where the optical intensity is sensed and to shorten a time period for the core alignment as a consequence. Note that the present invention is not limited to the simultaneous use of the amplification means and the one-dimensional optical intensity distribution. It is also possible to combine the present invention with various conventionally known modes (e.g., the technology of using the spiral scanning and the hill-climbing method at the same time or the technology disclosed in Japanese Patent Publication No. 7(1995)-113694).

A method for core alignment between optical components according to the present invention is a method for core alignment between optical components for adjusting relative positions between first and second optical components. Herein, amplification means is used for amplifying an output of a photodetector configured to detect light being emitted from the first optical component and introduced to the second optical component. Moreover, the method includes the step of allowing the amplification means to perform logarithmic amplification before the relative position approaches a core alignment position, and of allowing the amplification means to perform linear amplification after the relative position approaches the core alignment position.

In the method for core alignment between optical components according to the present invention, a signal based on the logarithmic amplification is used before approaching the core alignment position and a signal based on the linear amplification is used after approaching the core alignment position. Accordingly, it is possible to further enhance precision in the core alignment by using the linear amplification which facilitates detection of a signal change in a narrower range in the vicinity of the core alignment position as well as gaining an advantage of performing the logarithmic amplification.

An apparatus for core alignment between optical components according to the present invention is an apparatus for core alignment between optical components for adjusting relative positions between first and second optical components. Herein, the apparatus includes: amplification means for amplifying an output of a photodetector configured to detect light being emitted from the first optical component and introduced to the second optical component; moving means for changing the relative positions between the first and second optical components; controlling means for controlling the moving means to adjust the relative positions based on the output of the amplification means; and reciprocally scanning means for subjecting the first optical component and the second optical component relatively to reciprocal scanning by repeating one-dimensionally concerning one axis. Moreover, the controlling means obtains one-dimensional optical intensity distribution concerning the one axis based on the output of the amplification means being obtained in accordance with the reciprocal scanning and controls the moving means to adjust the relative positions between the first and second optical components based on the obtained one-dimensional optical intensity distribution.

In the apparatus for core alignment between optical components according to the present invention, position adjustment is performed by utilizing the one-dimensional optical intensity distribution in a lump as described above. Accordingly, it is possible to reduce redundant operations for searching signals and to perform prompt alignment between the first and second optical components.

In the present invention, it is preferable that the amplification means performs logarithmic amplification.

Meanwhile, in the present invention, it is preferable that the amplification means selectively performs any of logarithmic amplification and linear amplification in response to a selection signal and that the controlling means provides the selection signal to the amplification means to allow the amplification means to perform the logarithmic amplification before the relative position approaches a core alignment position and to allow the amplification means to perform the linear amplification after the relative position approaches the core alignment position.

Meanwhile, in the present invention, it is preferable that the controlling means obtains any of an integral value and an average value in a given range of the optical intensity from the one-dimensional optical intensity distribution and controls the moving means to move a central position of the reciprocal scanning to a given direction being approximately perpendicular to a direction of an optical axis of the light emitted from the first optical component, and to stop movement to the given direction at any of a position where any one of the integral value and the average value becomes the maximum and a position in the vicinity thereof.

Meanwhile, in the present invention, it is preferable that the controlling means obtains any of a peak value and a given ratio width of the optical intensity from the one-dimensional optical intensity distribution, and that the controlling means controls the moving means to move a central position of the reciprocal scanning to a given direction, and to stop movement to the given direction at any of a position of any one of a point where the peak value becomes the maximum and a point in the vicinity thereof, and a position of any one of a point where the given ratio width becomes the minimum and a point in the vicinity thereof.

Meanwhile, in the present invention, it is preferable that the light emitted from the first optical component is light to be focused on a focal spot, and that the controlling means obtains any one of an integral value, an average value, and a peak value of optical intensity from the one-dimensional optical intensity distribution, and that the controlling means controls the moving means to move a central position of the reciprocal scanning to a first direction while offsetting the central position to a second direction being approximately perpendicular to the first direction approximately coincident with a direction of an optical axis of the light emitted from the first optical component, and to stop the movement to the first direction at any of a position where any one of the integral value, the average value, and the peak value becomes the minimum and a position in the vicinity thereof.

Meanwhile, in the present invention, it is preferable that the controlling means obtains any of a peak value and a given ratio width of the optical intensity from the one-dimensional optical intensity distribution, and that the controlling means controls the moving means to move a central position of the reciprocal scanning to a given direction approximately perpendicular to a direction of an optical axis of the light emitted from the first optical component, and to stop the movement to the given direction at any of a position where any one of the peak value and the given ratio width becomes a given value and a position in the vicinity thereof.

An apparatus for core alignment between optical components according to the present invention is an apparatus for core alignment between optical components for adjusting relative positions between first and second optical components. Herein, the first optical component includes a plurality of regions being arranged on an approximately straight line and capable of respectively emitting light mutually parallel along an optical axis, and the second optical component includes a plurality of regions being arranged on an approximately straight line and capable of respectively allowing light to be incident. Moreover, the apparatus includes: at least two pieces of amplification means for amplifying outputs corresponding to at least two photodetectors for respectively detecting light being respectively emitted from at least two corresponding regions of the plurality of regions of the first optical component and respectively introduced to at least two corresponding regions of the plurality of regions of the second optical component; moving means for changing the relative positions between the first and second optical components; controlling means for controlling the moving means to adjust the relative positions based on outputs of at least the two pieces of the amplification means; and reciprocally scanning means for subjecting the first optical component and the second optical component relatively to reciprocal scanning by repeating one-dimensionally concerning one axis. Herein, the controlling means obtains one-dimensional optical intensity distribution concerning the one axis for each output respectively based on each of the outputs of at least the two pieces the amplification means obtained in accordance with the reciprocal scanning, and that the controlling means controls the moving means to adjust the relative positions between the first and second optical components based on respective pieces of the one-dimensional optical intensity distribution so as to reduce a variation of peak positions of the respective pieces of the one-dimensional optical intensity distribution.

In the apparatus for core alignment between optical components according to the present invention, it is possible to perform prompt adjustment of the relative positions between the first optical component having the plurality of regions being arranged on the approximately straight line and capable of respectively emitting light mutually parallel along the optical axis, and the second optical component having the plurality of regions being arranged on the approximately straight line and capable of respectively allowing the light to be incident.

An apparatus for core alignment between optical components according to the present invention is an apparatus for core alignment between optical components for adjusting relative positions between first and second optical components. Herein, the apparatus includes: amplification means for amplifying an output of a photodetector configured to detect light being emitted from the first optical component and introduced to the second optical component; moving means for changing the relative positions between the first and second optical components; and controlling means for controlling the moving means to adjust the relative positions based on an output of the amplification means. Herein, the amplification means performs logarithmic amplification.

In the apparatus for core alignment between optical components according to the present invention, since the output of the photodetector is logarithmically amplified, it is possible to considerably expand a three-dimensional space where optical intensity can be monitored as a signal. Therefore, it is possible to considerably shorten a time period for searching a region where the optical intensity is sensed and to shorten a time period for the core alignment as a consequence.

An apparatus for core alignment between optical components according to the present invention is an apparatus for core alignment between optical components for adjusting relative positions between first and second optical components. Herein, the apparatus includes: amplification means for amplifying an output of a photodetector configured to detect light being emitted from the first optical component and introduced to the second optical component; moving means for changing the relative positions between the first and second optical components; and controlling means for controlling the moving means to adjust the relative positions based on an output of the amplification means. Herein, the amplification means selectively performs any of logarithmic amplification and linear amplification in response to a selection signal, and the controlling means provides the selection signal to the amplification means to allow the amplification means to perform the logarithmic amplification before the relative position approaches a core alignment position and to allow the amplification means to perform the linear amplification after the relative position approaches the core alignment position.

In the apparatus for core alignment between optical components according to the present invention, a signal based on the logarithmic amplification is used before approaching the core alignment position and a signal based on the linear amplification is used after approaching the core alignment position. Accordingly, it is possible to further enhance precision in the core alignment by using the linear amplification which facilitates detection of a signal change in a narrower range in the vicinity of the core alignment position as well as gaining an advantage of performing the logarithmic amplification.

The following aspects of the invention are concerning an apparatus for core alignment between optical components in which judgment based on the output of the amplification means and the like relies on an operator.

Firstly, an apparatus for core alignment between optical components according to the present invention is an apparatus for core alignment between optical components for adjusting relative positions between first and second optical components. Herein, the apparatus includes: amplification means for amplifying an output of a photodetector configured to detect light being emitted from the first optical component and introduced to the second optical component; moving means for changing the relative positions between the first and second optical components in response to an operation by an operator; reciprocally scanning means for subjecting the first and second optical components relatively to reciprocal scanning by repeating one-dimensionally concerning one axis; means for obtaining one-dimensional optical intensity distribution concerning the one axis based on the output of the amplification means being obtained in accordance with the reciprocal scanning; and indicating means for indicating the one-dimensional optical intensity distribution to the operator.

In the present invention, it is preferable that the amplification means performs logarithmic amplification.

Meanwhile, in the present invention, it is preferable that the amplification means selects any of logarithmic amplification and linear amplification in response to an operation by the operator.

Meanwhile, an apparatus for core alignment between optical components according to the present invention is an apparatus for core alignment between optical components for adjusting relative positions between first and second optical components. Herein, the first optical component includes a plurality of regions being arranged on an approximately straight line and capable of respectively emitting light mutually parallel along an optical axis, and the second optical component includes a plurality of regions being arranged on an approximately straight line and capable of respectively allowing light to be incident. Moreover, the apparatus includes: at least two pieces of amplification means for amplifying outputs corresponding to at least two photodetectors for respectively detecting light being respectively emitted from at least two corresponding regions from the plurality of regions of the first optical component and respectively introduced to at least two corresponding regions from the plurality of regions of the second optical component; moving means for changing the relative positions between the first and second optical components in response to an operation by an operator; reciprocally scanning means for subjecting the first optical component and the second optical component relatively to reciprocal scanning by repeating one-dimensionally concerning one axis; means for obtaining one-dimensional optical intensity distribution concerning the one axis for each output respectively based on each of the outputs of at least the two pieces of the amplification means obtained in accordance with the reciprocal scanning; and indicating means for indicating respective pieces of the one-dimensional optical intensity distribution to the operator.

Meanwhile, an apparatus for core alignment between optical components according to the present invention is an apparatus for core alignment between optical components for adjusting relative positions between first and second optical components. Herein, the apparatus includes: amplification means for amplifying an output of a photodetector configured to detect light being emitted from the first optical component and introduced to the second optical component; indicating means for indicating information based on an output of the amplification means to an operator; and moving means for changing the relative positions between the first and second optical components in response to an operation by the operator. Herein, the amplification means performs logarithmic amplification.

Meanwhile, an apparatus for core alignment between optical components according to the present invention is an apparatus for core alignment between optical components for adjusting relative positions between first and second optical components. Herein, the apparatus includes: amplification means for amplifying an output of a photodetector configured to detect light being emitted from the first optical component and introduced to the second optical component; moving means for changing the relative positions between the first and second optical components in response to an operation by an operator; and indicating means for indicating information based on an output of the amplification means to the operator. Herein, the amplification means selects any of logarithmic amplification and linear amplification in response to an operation by the operator.

Assuming that mutually orthogonal axes are respectively defined as an X axis, a Y axis, and a Z axis, and that a rotation axis around the X axis is defined as an $X\theta$ axis, a rotation axis around the Y axis is defined as a $Y\theta$ axis, and a rotation axis around the Z axis is defined as a $Z\theta$ axis, the above-described one axis may be any of the X axis, the Y axis, the Z axis, the $X\theta$ axis, the $Y\theta$ axis, and the $Z\theta$ axis, for example. Moreover, in this event, the Z axis may be approximately coincident with a direction of an optical axis of the light emitted from the first optical component. Meanwhile, each of the first and second components may be a discrete component or a so-called optical module composed of a plurality of components.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 9 is a schematic block diagram schematically showing an assembly apparatus for optical components according to a second embodiment.

DESCRIPTION OF THE PREFERRED EMBODIMENTS

Figure 1:
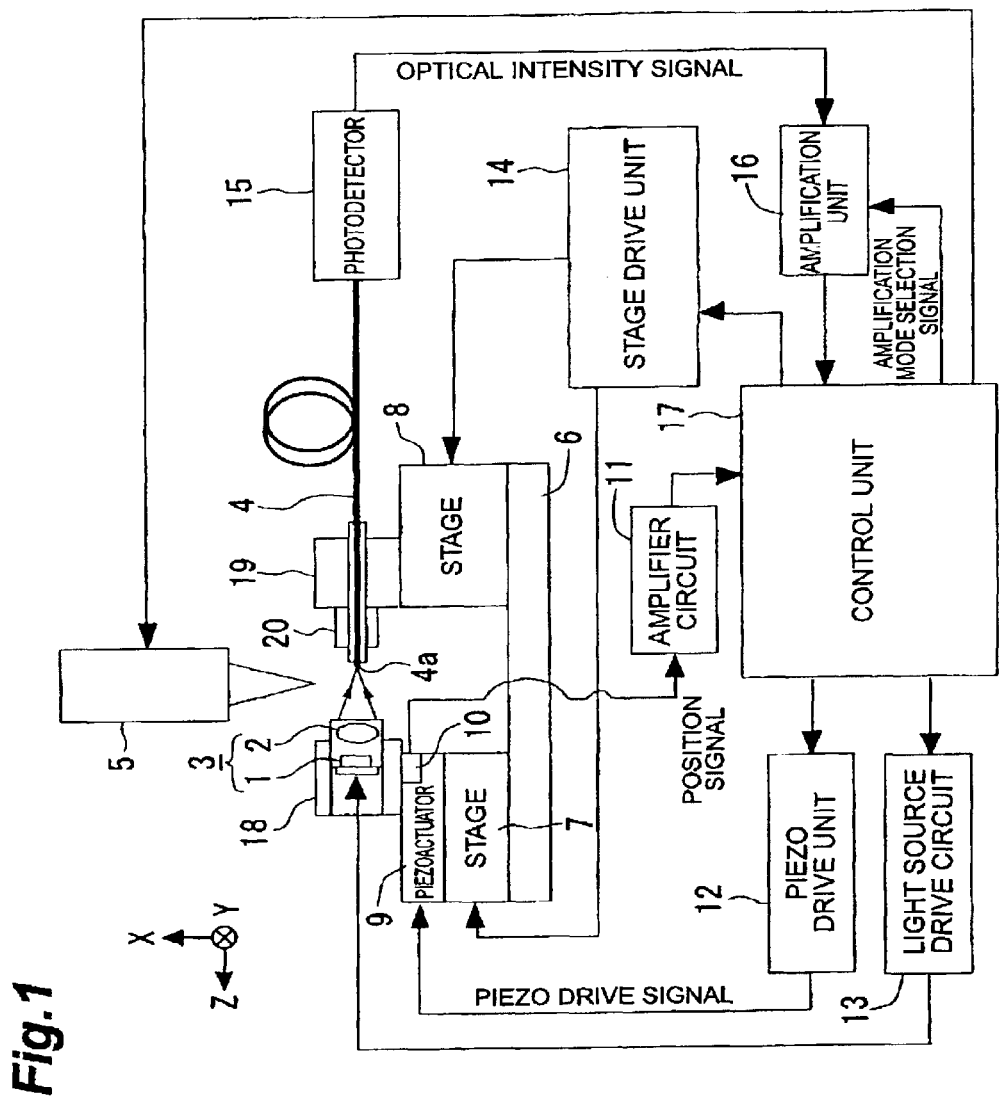
FIG. 1 is a schematic block diagram schematically showing an assembly apparatus for optical components according to a first embodiment.

Embodiments of a method and an apparatus for core alignment between optical components will be now described with reference to the accompanying drawings. It is to be noted that the same elements are designated by the same reference numerals throughout the drawings, and redundant explanation is thereby omitted. It is also to be noted that an assembly apparatus for optical components or a high-frequency property measuring apparatus in the following embodiments includes an apparatus for core alignment between optical components according to an embodiment of the present invention.

(First Embodiment)

FIG. 1 is a schematic block diagram schematically showing an assembly apparatus for optical components according to a first embodiment.

An assembly apparatus of the first embodiment is configured as an apparatus for assembling a semiconductor laser module for coupling light from a semiconductor laser 1 with an optical fiber by performing core alignment between a light source module (corresponding to a first optical component) 3 having the semiconductor laser 1 and a condenser lens 2, and, an end face 4a of a single-core optical fiber 4 (corresponding to a second optical component), and joining the both components together with a laser welder 5. Of the respective elements to be described later, the apparatus for core alignment between optical components of this embodiment is configured by all the elements except the laser welder 5 and a laser welder controlling function in the following control unit 17.

Apart from the laser welder 5, the above assembly apparatus includes: a base material 6; a stage 7 for the light source module 3 as a moving mechanism mounted on the base material 6; a stage 8 for the optical fiber 4 as a moving mechanism mounted on the base material 6; a piezoactuator 9 being mounted on the stage 7 and serving as a reciprocal scanning mechanism for reciprocally scanning the stage 7 by repeating one-dimensionally concerning one axis of the light source module 3; a position detector 10 (such as an electrostatic sensor or a differential transformer) for detecting a position of the light source module 3 relative to the stage 7; an amplifier circuit 11 for amplifying a detection signal from the position detector 10; a piezo drive unit 12 for driving the piezoactuator 9; a light source drive circuit 13 for allowing the semiconductor laser 1 in the light source module 3 to emit light; a stage drive unit 14 for driving the stages 7 and 8; a photodetector 15 (such as a photodiode) for detecting the light introduced from the end portion 4a into the optical fiber 4; an amplification unit 16 for amplifying an output of the photodetector 15; and the control unit 17 for controlling the entire apparatus. The control unit 17 can be configured by use of a personal computer, for example.

The light source module 3 is mounted on the piezo actuator 9 via a holder 18. A portion on the end potion 4a side of the optical fiber 4 is mounted on the stage 8 via a holder 19 having a V-shaped groove and the like. In this way, the light source module 3 and the end portion 4a of the optical fiber 4 face each other. At the portion of the end portion 4a side of the optical fiber 4, there is provided a ring-shaped joining member 20 for effectuating joining between the optical fiber 4 and the light source module 3 after the core alignment.

To facilitate explanation, mutually orthogonal axes are respectively defined as an X axis, a Y axis, and a Z axis as shown in FIG. 1. The Z direction approximately coincides with the direction of an optical axis of the light source module 3 and of the end portion 4a of the optical fiber 4. Note that the side of each of the axes pointed by an arrow is defined as positive (+), and the opposite side is defined as negative (−). Such definitions are also similarly applied to the respective embodiments to be described later.

The stage 7 has a function to move the piezoactuator 9 (i.e. the light source module 3) along the X axis, the Y axis, or the Z axis independently. However, in this embodiment, the stage 7 is only used upon initial position setting in the beginning of core alignment or the like, and the stage 7 remains fixed during the core alignment. Therefore, the stage 7 is incorporated with the base material 6 in the following description. Herein, as a matter of course, the stage 7 can be used together with or instead of the stage 8.

In this embodiment, the piezoactuator 9 is driven by a piezo drive signal (a sinusoidal analog voltage signal) outputted by the piezo drive unit 12 in response to an instruction from the control unit 17, and the piezoactuator 9 reciprocally move (reciprocally scan) the light source module 3 by repeating in the X-axis direction relative to the stage 7 (i.e. relative to the base material 6). In other words, the piezoactuator 9 subjects the light source module 3 to reciprocal scanning by repeating in the X-axis direction relative to the base material 6. Herein, instead of the piezoactuator 9, it is also possible to use a voice coil motor, an electromagnetic plunger, a linear stage, or the like for a reciprocal scanning mechanism.

The position of the light source module 3 relative to the stage 7 (an amount of displacement of the piezoactuator 9) is detected by the position detector 10. The detection signal from the position detector 10 is amplified by the amplifier circuit 11 and inputted to the control unit 17. Herein, since a piezoactuator 9 incorporating the position detector 10 is commercially available, such a piezoactuator 9 can be used, for example. Moreover, the drive signal for driving the piezoactuator 9 corresponds to the amount of displacement of the piezoactuator 9. Accordingly, it is also possible to use the drive signal itself as a position detection signal instead of using the position detector 10.

The semiconductor laser 1 of the light source module 3 is allowed to emit the light in a constant light quantity in response to an electric current supplied from the light source drive circuit 13, and a minute light spot is formed in a focal position of the condenser lens 2 In accordance with the reciprocal scanning of the light source module 3 by the piezoactuator 9, the light spot is also reciprocally scanned. The position where the focal position and the end portion 4a of the optical fiber 4 coincide constitutes a core alignment position.

The stage 8 has a function to move the optical fiber 4 (to be more precise, the portion of the incident end 4a side of the optical fiber 4) along the X axis, the Y axis, or the Z axis independently. The stage 8 is formed as a combination of an X-axis stage, a Y-axis stage, and a Z-axis stage. However, illustration of the X-axis stage, the Y-axis stage, and the Z-axis stage is omitted in the drawing. In this embodiment, the stage 8 is used as a position adjustment mechanism during the core alignment.

The photodetector 15 is disposed at an outgoing end of the optical fiber 4 and detects laser intensity being incident from the light source module 3 into the optical fiber 4. An output signal of the photodetector 15 is amplified by the amplification unit 16 and sent to the control unit 17 as an optical intensity signal.

Figure 2:
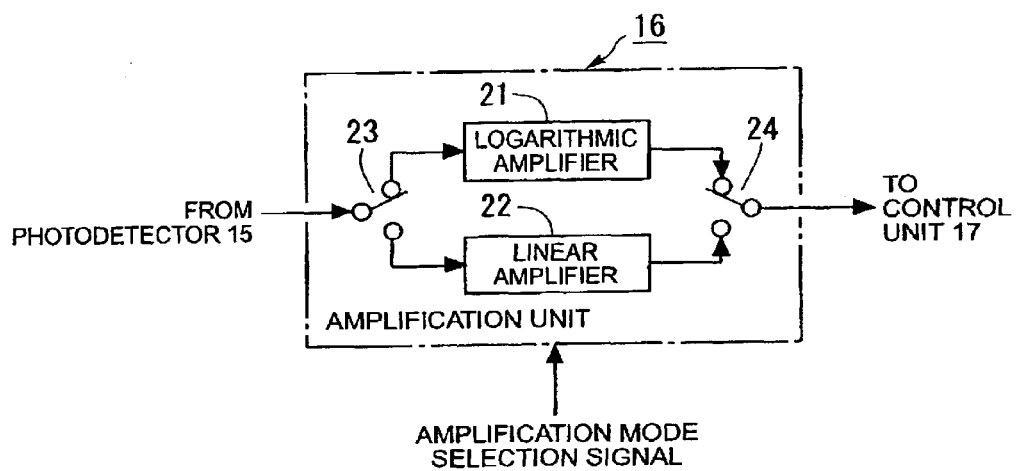
FIG. 2 is a schematic block diagram showing one example of a configuration of an amplification unit.
Figure 3:
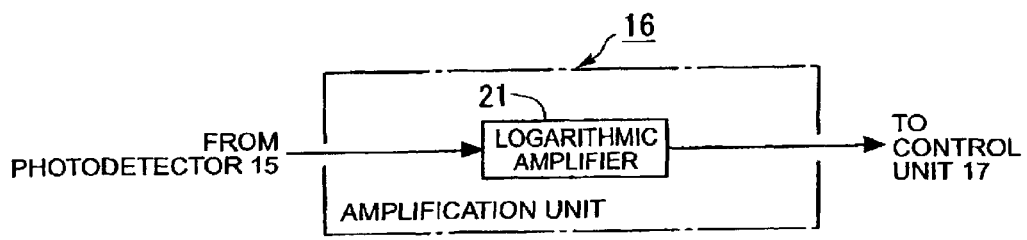
FIG. 3 is a schematic block diagram showing another example of a configuration of the amplification unit.

In this embodiment, the amplification unit 16 is configured to select any of logarithmic amplification and linear amplification in response to an amplification mode selection signal from the control unit 17. One example of the configuration of the amplification unit 16 is shown in FIG. 2. FIG. 2 is a schematic block diagram showing one example of the configuration of the amplification unit 16. In the example shown in FIG. 2, the amplification unit 16 includes: a logarithmic amplifier 21; a linear amplifier 22; and switches 23 and 24 for switching between the amplifiers in response to the amplification mode selection signal. The amplification unit 16 may be configured to perform the logarithmic amplification constantly. In this case, the amplification unit 16 may include only the logarithmic amplifier 21 as shown in FIG. 3. Since the logarithmic amplifier usually includes a function to modify an amplification degree thereof, such an amplification degree may be switched by the amplification mode selection signal.

The logarithmic amplifier 21 has a logarithmic amplification property relative to an input. For example, one designed to output a voltage in a range from −10 V to +10 V with respect to an electric current change in six digits from 1 nA to 1 mA can be used as the logarithmic amplifier 21. In this case, since sensitivity of a photodiode (PD) used as the photodetector 15 is normally at about 0.5 A/W, a voltage output ranging from −10 V to +10 V is equivalent to a range from 2 nW to 2 mW when converted into optical input power of the PD. Meanwhile, the linear amplifier 22 can sense an electric current change in a narrow range more easily as compared with the logarithmic amplifier 21. However, the linear amplifier 22 can sense only an electric current change in, for example, two or three digits. Therefore, by use of the logarithmic amplifier 21 as described above, it is possible to detect a change in signal intensity ranging in six digits in real time without gain switching. As a result, it is possible to conduct adjustment of a three-dimensional shift between a focal spot (the focal position) and an incident point (the end portion 4a of the optical fiber 4) while monitoring signal intensity in a wider space as compared with the case of using the linear amplifier 22 constantly similarly to the conventional technologies, which is three or more times larger in area in terms of the respective axes and about thirty times larger in volume.

Figure 4:
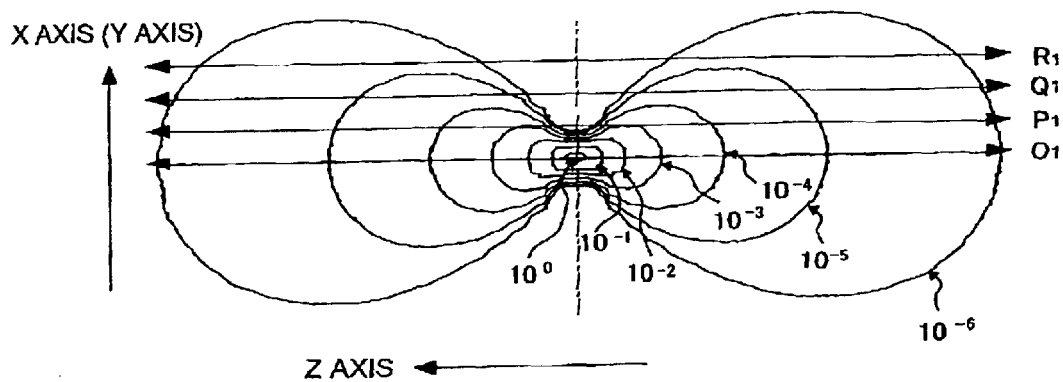
FIG. 4 is a view schematically showing optical intensity distribution.
Figure 5:
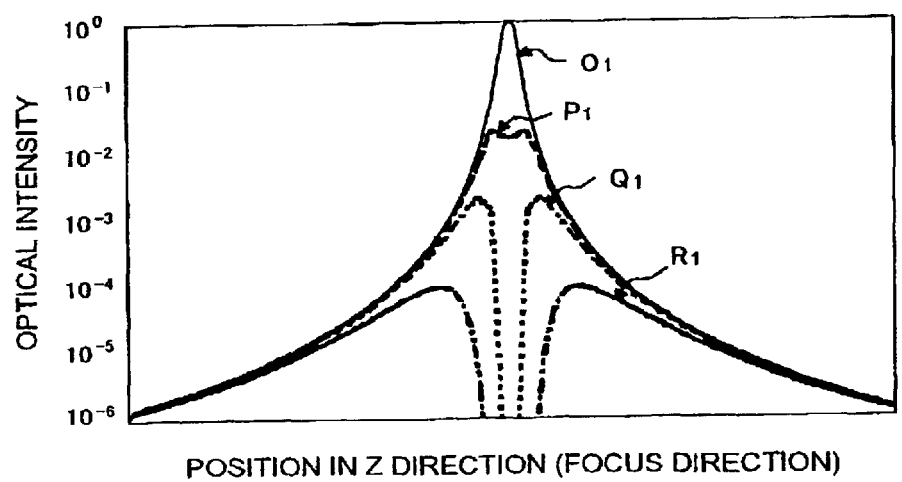
FIG. 5 is a graph showing optical intensity on respective lines indicated in FIG. 4.
Figure 6:
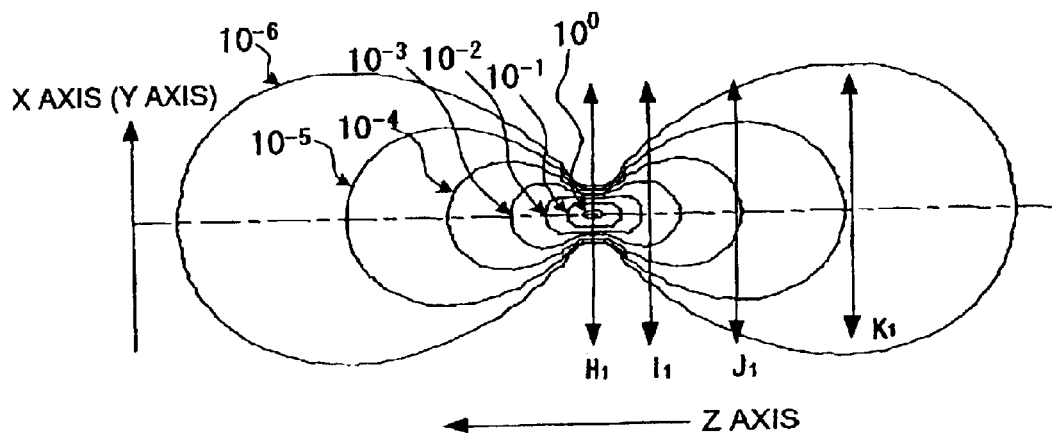
FIG. 6 is another view schematically showing optical intensity distribution.
Figure 7:
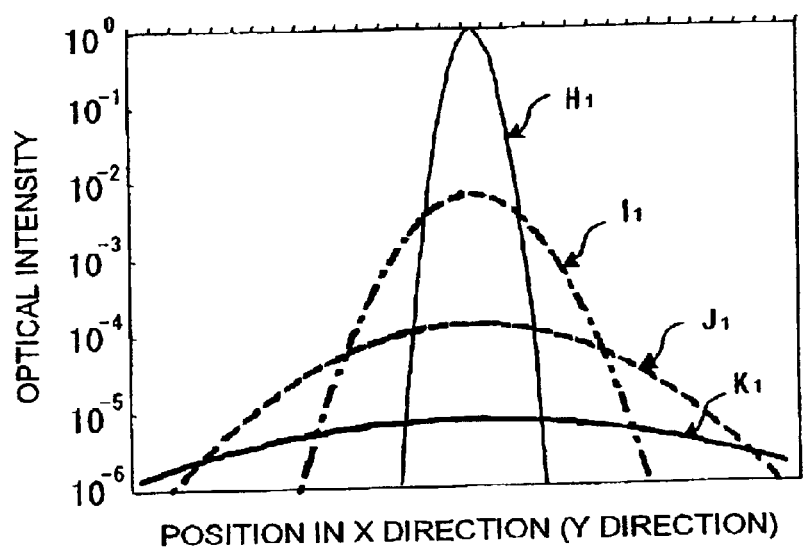
FIG. 7 is a graph showing optical intensity on respective lines indicated in FIG. 6.

Now, a description will be given of intensity distribution of the light emitted from the light source module 3 (the light focused with the condenser lens 2) with reference to FIG. 4 to FIG. 7. FIG. 4 and FIG. 6 are distribution maps schematically showing optical intensity distribution within a plane which is parallel to an XZ plane (or an YZ plane) and includes the focal position. Note that the optical intensity distribution becomes almost rotationally symmetric around a straight line which passes through the focal position and is parallel to the Z axis FIG. 4 and FIG. 6 are logarithmic displays based on the assumption that optical intensity of a focused beam expands from the focal position in accordance with Gaussian distribution, in which the optical intensity in the focal position is standardized as 1 (=10°) while drawing intensity contour lines of respective digits therein. FIG. 5 is a graph showing aspects of the optical intensity in respective positions in the Z direction on respective lines $O_1$, $P_1$, $Q_1$, and $R_1$ shown in FIG. 4, which are parallel to the Z axis and mutually displaced along the X direction (or the Y direction). FIG. 7 is a graph showing aspects of the optical intensity in respective positions in the X direction (or the Y direction) on respective lines $H_1$, $I_1$, $J_1$, and $K_1$ shown in FIG. 6, which are parallel to the X axis (or the Y axis) and mutually displaced along the Z direction.

As it is apparent from FIG. 4 to FIG. 7, the beam is focused three-dimensionally very small in the focal position of the light source and generates extremely high optical intensity. However, the beam is suddenly attenuated in front or at the back of the focal spot and outward the X and Y axes. If the linear amplifier 22 is constantly used similarly to the conventional technologies, the range of the signal intensity observable at a time remains, for example, two or three digits. Accordingly, the linear amplifier 22 can only observe the range defined by two or three intensity contour lines in FIG. 4 and FIG. 6 at a time. On the contrary, when the logarithmic amplifier 21 is used therein, it is possible to observe, for example, the range from center points (the focal positions) of FIG. 4 and FIG. 6 to the outermost intensity contour lines (the intensity contour lines indicating $10^{-6}$) at the same time.

Next, a core alignment operation using the assembly apparatus of the first embodiment will be described with reference to FIG. 8A to FIG. 8D. FIG. 8A to FIG. 8D are views showing aspects of movement of the optical fiber 4 and the end portion (a tip portion) 4a thereof in respective adjusting steps as well as the optical intensity distribution as shown in FIG. 4 and FIG. 6. To facilitate understanding, the origin (center) of the X axis, the Y axis, and the Z axis is defined as the focal spot in FIG. 8A to FIG. 8D.

Concerning initial position setting when starting the core alignment operation, a description will be given below of the case where mechanical setting errors of the tip portion 4a of the optical fiber 4 relative to the focal spot of the light source module 3 remain within the range of about ±250 μm in the Z-axis direction and the range of about ±200 μm in the X-axis and Y-axis directions.

Firstly, the position of the tip portion 4a of the optical fiber 4 is set to a position, which is displaced in advance by about −1000 μm (distant from the light source module 3) in the Z-axis direction and by about −250 μm respectively in the X-axis and Y-axis directions relative to an expected focal point (such a position is a setting position, and an actual position will be further displaced from the setting position by the amounts equivalent to the setting errors), and the core alignment operation is started.

When the core alignment operation is started, the control unit 17 provides an instruction to the piezo drive 12, thereby driving the piezoactuator 9 via the piezo drive unit 12. Accordingly, the control unit 17 subjects the light source module 3 and the focal spot thereof to reciprocal scanning (as indicated with an arrow $X_{RE}$ in FIG. 8B) by repeating in the X-axis direction at a given frequency (such as 30 Hz) and with a sinusoidal waveform of a given amplitude (such as 100 to 300 μm). Moreover, the control unit 17 allows the semiconductor laser 1 of the light source module 3 to emit light at a given electric current value via the light source drive circuit 13.

Note that the frequency upon the reciprocal scanning contributes more to reduction in a time period for the core alignment and to enhancement in core alignment precision because reference data are increased more as the frequency becomes higher. It is preferable that the frequency upon the reciprocal scanning is set to 5 Hz or higher, or more preferably 30 Hz or higher. When the piezoactuator is used as the actuator for the reciprocal scanning, the frequency can be set in a range, for example, from 30 to 240 Hz.

The intensity of the outgoing light of the optical fiber 4 is detected by the photodetector 15. The output thereof is amplified by the amplification unit 16 and an output of the amplification unit 16 is supplied to the control unit 17. The control unit 17 provides the amplification mode selection signal to the amplification unit 16 to allow the amplification unit 16 to perform the logarithmic amplification. In this embodiment, the amplification unit 16 is allowed to perform the logarithmic amplification continuously except the case of performing fine adjustment to be described later. Meanwhile, a position detection signal obtained from the position detector 10 via the amplifier circuit 11 is supplied to the control unit 17. The control unit 17 performs A/D conversion of the position detection signal from the amplifier circuit 11 and the output (the amplified optical intensity signal) from the amplification unit 16, and takes in the signal and the output respectively as data. In this way, the control unit 17 serially obtains the optical intensity distribution across the entire amplitude of the reciprocal scanning in the X-axis direction, for example, in every half cycle of the reciprocal scanning.

Such obtainment of the one-dimensional optical intensity distribution in accordance with the reciprocal scanning in the X-axis direction by the piezoactuator 9 is serially continued until the time point to be described later.

Figure 8A:
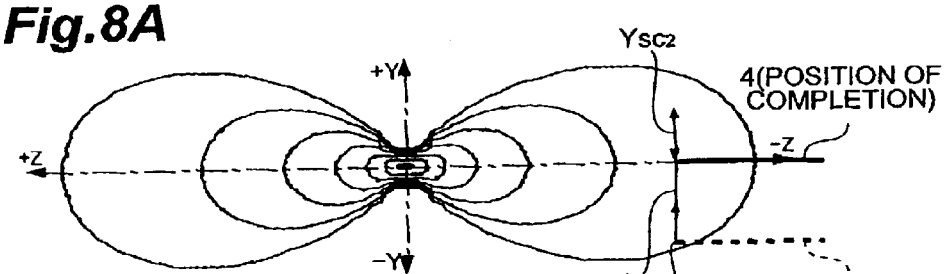
FIGS. 8A to 8D are views showing an aspect of movement of an optical fiber in respective adjusting steps as well as the optical intensity distribution.

In this state, position adjustment in the Y-axis direction is firstly performed as shown in FIG. 8A. In this step, concerning the respective pieces of the one-dimensional optical intensity distribution serially obtained as described above, the control unit 17 calculates either an integral value or an average value of the optical intensity in a given range from the optical intensity distribution. Therefore, the control unit 17 scans the Y-axis stage in the positive direction (the direction indicated with an arrow $Y_{SC1}$ in the drawing) via the stage drive unit 14 as monitoring either the integral value or the average value in the given range of the optical intensity obtained from each piece of the one-dimensional optical intensity distribution. Moreover, the control unit 17 finds the position where the integral value or the average value becomes the maximum (corresponding approximately to the central position in the Y-axis direction), and stops the Y-axis stage. In this event, to find the position where the integral value or the average value becomes the maximum, as indicated by an arrow $Y_{SC2}$ in FIG. 8A, the Y-axis stage is moved to go beyond the position toward the positive direction and then is put back and stopped in the position where the integral value or the average value becomes the maximum. It can be understood, from the optical intensity distribution described with reference to FIG. 4 to FIG. 7, that the position where the integral value or the average value becomes the maximum corresponds approximately to the central position in the Y-axis direction. Herein, instead of the position where the integral value or the average value becomes the maximum, it is also possible to stop the Y-axis stage in a position in the vicinity thereof. This is for performing readjustment regarding the Y-axis direction in the final adjustment to be described later with reference to FIG. 8D.

Figure 8B:
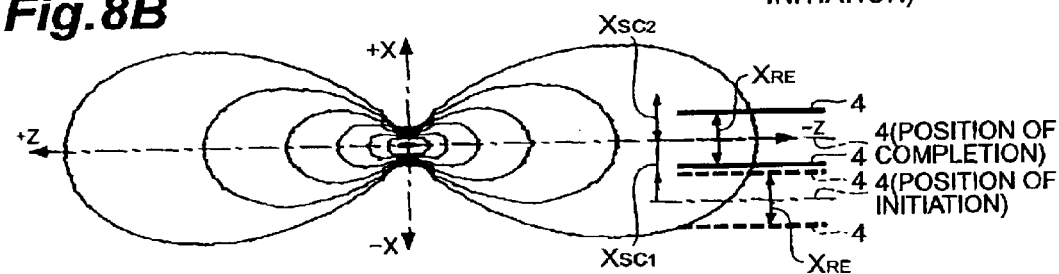

Subsequently, position adjustment in the X-axis direction is performed as shown in FIG. 8B. In this step as well, concerning the respective pieces of the one-dimensional optical intensity distribution serially obtained as described above, the control unit 17 calculates either an integral value or an average value of the optical intensity in a given range from the optical intensity distribution. Thereafter, the control unit 17 scans the X-axis stage in the positive direction (the direction indicated with an arrow $X_{SC1}$ in the drawing) via the stage drive unit 14 as monitoring either the integral value or the average value in the given range of the optical intensity obtained from each piece of the one-dimensional optical intensity distribution. Moreover, the control unit 17 finds the position where the integral value or the average value becomes the maximum (corresponding approximately to the central position in the X-axis direction), and stops the X-axis stage. In this event, to find the position where the integral value or the average value becomes the maximum, as indicated with an arrow $X_{SC2}$ in FIG. 8B, the X-axis stage is moved to go beyond the position toward the positive direction and is put back, and stopped in the position where the integral value or the average value becomes the maximum. It can be understood from the optical intensity distribution described with reference to FIG. 4 to FIG. 7 that the position where the integral value or the average value becomes the maximum corresponds approximately to the central position in the X-axis direction. Herein, instead of the position where the integral value or the average value becomes the maximum, it is also possible to stop the X-axis stage in a position in the vicinity thereof. This is for performing readjustment regarding the X-axis direction in the final adjustment to be described later with reference to FIG. 8D.

Figure 8C:
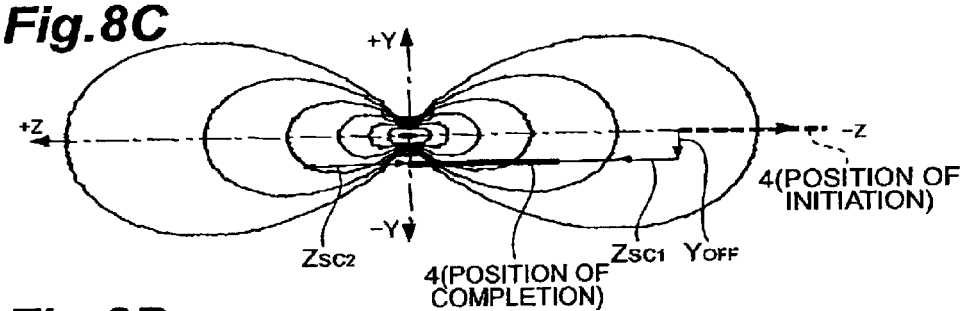

Next, position adjustment in the Z-axis direction is performed as shown in FIG. 8C. Specifically, the control unit 17 firstly offsets the Y-axis stage to the positive direction or the negative direction by a given amount YOFF (such as several tens of micrometers) via the stage drive unit 14. It is because the integral value, the average value and a peak value of the optical intensity obtained from each piece of the one-dimensional optical intensity distribution serially obtained as described above become the minimum approximately in a central position of the z-axis direction when the Z-axis stage is scanned in the positive direction (the direction indicated with an arrow $Z_{SC1}$ in the drawing), as can be understood from the optical intensity distribution described with reference to FIG. 4 to FIG. 7. Concerning the respective pieces of the one-dimensional optical intensity distribution serially obtained as described above, the control unit 17 calculates any of the integral value, the average value, and the peak value of the optical intensity from the optical intensity distribution after offsetting the Y-axis stage. The control unit 17 scans the Z-axis stage in the positive direction as indicated with an arrow $Z_{SC2}$ in FIG. 8C via the stage drive unit 14 while monitoring any of the integral value, the average value, and the peak value of the optical intensity obtained from each piece of the one-dimensional optical intensity distribution. Moreover, the control unit 17 confirms that any of the integral value, the average value, and the peak value declines and turns into an increase after indicating the minimum value, and puts the Z-axis stage back to the position of the minimum value and stops the Z-axis stage. Herein, instead of the position where any of the integral value, the average value, and the peak value becomes the minimum, it is also possible to stop the Z-axis stage in a position in the vicinity thereof. This is for performing readjustment regarding the Z-axis direction in the final adjustment to be described later with reference to FIG. 8D.

According to the above-described operations, the end portion 4a of the optical fiber 4 comes close to the core alignment position (the position of the focal spot).

Figure 8D:
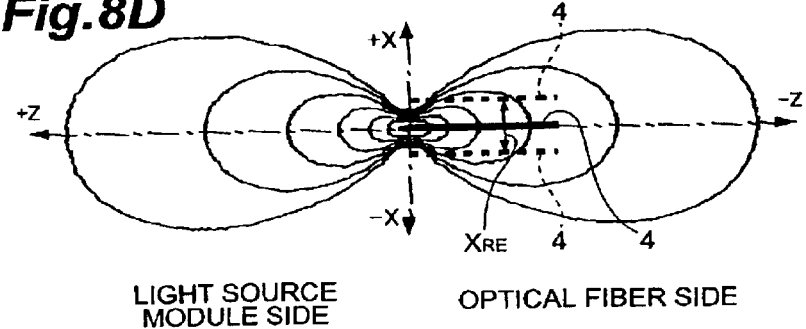

Thereafter, final adjustment is performed as shown in FIG. 8D. In this final adjustment, the readjustment in the Y-axis direction, the readjustment in the Z-axis direction, and the readjustment in the X-axis direction are serially performed. In order to further enhance the core alignment precision, it is preferred to perform the readjustment in the Z-axis direction as described herein. However, the readjustment in the Z-axis direction may be omitted.

Firstly, in the readjustment in the Y-axis direction, concerning the respective pieces of the one-dimensional optical intensity distribution serially obtained as described above, the control unit 17 calculates either a peak value or a half width (which may be alternatively a given ratio width based on another ratio; such an alternative is hereinafter applicable) of the optical intensity from the optical intensity distribution. Thereafter, the control unit 17 scans the Y-axis stage via the stage drive unit 14 as monitoring either the peak value or the half width of the optical intensity obtained from each piece of the one-dimensional optical intensity distribution. Moreover, the control unit 17 finds either a position where the peak value becomes the maximum or a position where the half width becomes the minimum, and stops the Y-axis stage. It can be understood from the optical intensity distribution described with reference to FIG. 4 to FIG. 7 that the position where the peak value becomes the maximum or the position where the half width becomes the minimum corresponds to the central position in the Y-axis direction.

In the subsequent readjustment in the Z-axis direction, concerning the respective pieces of the one-dimensional optical intensity distribution serially obtained as described above, the control unit 17 calculates either a peak value or a half width of the optical intensity from the optical intensity distribution. The control unit 17 scans the Z-axis stage via the stage drive unit 14 as monitoring either the peak value or the half width of the optical intensity obtained from each piece of the one-dimensional optical intensity distribution. Moreover, the control unit 17 finds either a position where the peak value becomes the maximum or a position where the half width becomes the minimum, and stops the Z-axis stage. It can be understood from the optical intensity distribution described with reference to FIG. 4 to FIG. 7 that the position where the peak value becomes the maximum or the position where the half width becomes the minimum corresponds to the central position in the Z-axis direction. As it has been described already, the readjustment in the Z-axis direction may be omitted.

In the subsequent readjustment in the X-axis direction, the control unit 17 allows the piezo drive unit 12 to stop supply of the sinusoidal drive signal to the piezoactuator 9, thereby allowing the piezoactuator 9 to stop the reciprocal scanning in the X-axis direction (as indicated with an arrow $X_{RE}$ in FIG. 8D) Thereafter, the control unit 17 scans the X-axis stage via the stage drive unit 14, or alternatively, allows the piezoactuator 9 to scan in the X-axis direction via the piezo drive unit 12 while applying a direct-current sweeping voltage. Accordingly, the control unit 17 finds a position where a signal obtained from the amplification unit 16 becomes the maximum, sets the X-axis stage to the position and completes the core alignment operation.

In the above-described operations, the control unit 17 allowed the amplification unit 16 to perform the logarithmic amplification until the end. However, the control unit 17 may allow the amplification unit 16 to perform the linear amplification in the final step described above with reference to FIG. 8D. In this way, it is possible to further enhance resolution such as peak-point detection by switching the amplification mode of the amplification unit 16 to linear amplification after the end portion 4a of the optical fiber 4 approaches the core alignment position. Furthermore, it is also possible to perform the core alignment with higher precision at a submicron level and the like.

In the apparatus shown in FIG. 1, when the core alignment is completed, the ring-shaped joining member 20 is moved to the left direction in FIG. 1, and a space between the joining member 20 and the light source module 3, and a space between the joining member 20 and a ferrule of the optical fiber 4 are respectively spot-welded by use of a pulse laser from the laser welder 5 or the like.

Note that the adjustment in the Z-axis direction is performed in this embodiment while offsetting the Y-axis stage in the Y-axis direction by several tens of micrometers after the adjustment in the Y-axis direction and the adjustment in the X-axis direction. It is because the focal position can be more promptly detected in terms of performing focal spot adjustment if a detection target is defined including a no-signal region having a greatly wider space compared with defining the delicate focal spot itself as the detection target when adjusting a focal point. When such a mode is performed, as described in this embodiment, it is preferable to use the logarithmic amplifier 21 capable of observing a wide range of a light quantity change which may vary in six digits, for example, in real time.

In this embodiment, as previously mentioned, the one-dimensional optical intensity distribution concerning the X axis is obtained by reciprocally scanning the light source module 3 by repeating one-dimensionally in the X-axis direction with the piezoactuator 9. Thereafter, the position of the optical fiber 4 is adjusted based on this optical intensity distribution. In this way, position adjustment is performed by utilizing the one-dimensional optical intensity distribution in a lump unlike the conventional technologies. Accordingly, it is possible to reduce redundant operations for searching signals and to perform prompt alignment between the optical components. Moreover, since the position adjustment is performed by utilizing the integral value, the average value, or the waveform itself of the one-dimensional optical intensity distribution in a lump, it is possible to considerably reduce adverse affects, which are attributable to failure of the optical intensity distribution to form ideal Gaussian distribution and resultant local fluctuation in actual optical intensity distribution relative to the foregoing distribution. Moreover, in this embodiment, the output of the photodetector 15 is logarithmically amplified. Accordingly, it is possible to substantially expand a three-dimensional space where the optical intensity can be monitored as a signal. Moreover, it is possible to conduct adjustment relative to a three-dimensional shift between the focal spot and the end portion 4a of the optical fiber 4 while monitoring signal intensity in a wider space, which is three or more times larger in area in terms of the respective axes and about thirty times larger in volume compared with the case of using the linear amplification. In this way, according to this embodiment, it is possible to considerably expand the space capable of effectively obtaining the one-dimensional optical intensity distribution by using the logarithmic amplification in addition to the use of the one-dimensional optical intensity distribution. Accordingly, the effects of the both technologies are exerted synergically, which effectuate further reduction in the time for the core alignment.

The inventors of the present invention have actually created an apparatus which is similar to the apparatus according to this embodiment, and have conducted the core alignment between the light source module 3 and the optical fiber 4. As a result, the inventors have confirmed that the core alignment is completed in a very short time period of about 5 seconds.

In this embodiment, core alignment control is performed by defining the three axes of the X, Y, and Z axes as the axes of the core alignment. Furthermore, it is obvious that the present invention is also effective in the core alignment further including an Xθ axis, a Yθ axis, and a Zθ axis. For example, in the case of performing the core alignment further including the Xθ axis and the Yθ axis in this embodiment, a dynamic range of a detection system is enlarged by adaptation of the logarithmic amplification in spite of angular movement of the stage. Accordingly, a signal is less likely to be lost. Moreover, regarding the angular movement along the Xθ axis, it is also possible to detect a change in intensity distribution attributable to the angular movement if deviation of either a beam-spot position or a detection-point position attributable to the angular movement remains within the width of the piezoactuator 9. It is also possible to perform the core alignment by finding an optimum angle for optical coupling according to this method.

(Second Embodiment)

FIG. 9 is a schematic block diagram schematically showing an assembly apparatus for optical components according to a second embodiment.

The assembly apparatus of the second embodiment is different from the assembly apparatus of the first embodiment as follows. In the assembly apparatus of the first embodiment, the control unit 17 achieves automatic control of the core alignment. On the contrary, the assembly apparatus of the second embodiment is configured as an apparatus in which judgment based on the output of the amplification unit 16 and the like relies on an operator.

In the assembly apparatus of the second embodiment, the control unit 17 in the assembly apparatus of the first embodiment is removed. Instead, the assembly apparatus of the second embodiment includes: an operation unit 31 for allowing an operator to provide various instructions; a control unit 32 for controlling respective parts of the apparatus exactly as instructed by the operation unit 31; and an oscilloscope 33.

The control unit 32 allows the piezo drive unit 12 to drive the piezoactuator 9 in accordance with an instruction provided from the operator via the operation unit 31. The control unit 32 causes the light source drive circuit 13 to allow the semiconductor laser 1 to emit light in accordance with an instruction provided from the operator via the operation unit 31. The control unit 32 supplies the amplification mode selection signal to the amplification unit 16 in accordance with an instruction provided from the operator via the operation unit 31. The control unit 32 moves the stages 7 and 8 via the stage drive unit 14 in accordance with an instruction provided from the operator via the operation unit 31.

The oscilloscope 33 receives a signal processed by amplifying a position signal from the position detector 10 with the amplifier circuit 11 as a trigger signal, and displays an output signal of the amplification unit 16 as a time waveform. When the light source module 3 is reciprocally scanned in the X-axis direction by the piezoactuator 9, the position of the light source module 3 relative to the stage 7 (an amount of displacement of the piezoactuator 9) and the time are in correlation. Accordingly, the time waveform of the output signal of the amplification unit 16 which the oscilloscope 33 displays the position signal as the trigger signal shows one-dimensional optical intensity distribution in accordance with the reciprocal scanning in the X-axis direction by the piezoactuator 9. Thus, in this embodiment, the oscilloscope 33 constitutes an indication unit for indicating to the operator by displaying the one-dimensional optical intensity distribution. Nevertheless, for the indication unit for indicating the one-dimensional optical intensity distribution to the operator, it is also possible to use an image display unit such as a CRT, and a signal processing unit for taking in the position signal from the amplifier circuit 11 and the output from the amplification unit 16 and allowing the image display unit to serially display the optical intensity distribution across the entire amplitude of the reciprocal scanning in the X-axis direction directly, for example, in every half cycle of the reciprocal scanning. Herein, as a matter of course, the piezo drive signal may be used as the trigger signal instead of using the position signal from the amplifier circuit 11 as the trigger signal.

By use of the assembly apparatus of the second embodiment, the operator can perform the core alignment between the light source module 3 and the optical fiber 4 while achieving a method for core alignment similar to the method for core alignment achieved by the assembly apparatus of the first embodiment, by operating the operation unit 31, thereby adjusting the stage 8 as watching the waveform (the one-dimensional optical intensity distribution) displayed on the oscilloscope 33. However, since the operator makes judgment while watching the waveform, it is possible to adopt a method for core alignment to be described below.

A description will be given of one concrete example of the method for core alignment by use of the assembly apparatus of the second embodiment.

As it can be understood from the optical intensity distribution described with reference to FIG. 4 to FIG. 7, if the position of the end portion 4a of the optical fiber 4 in the Z-axis direction coincides with the position of the focal spot in the Z-axis direction, adjustment becomes difficult because variation of the signal intensity is increased relative to deviation in the Y-axis direction. Accordingly, regarding the position in the Z-axis direction, it is desirable that the adjustment is started from a position, which is displaced in advance from the position of the focal spot in the Z-axis direction by several hundreds of micrometers.

The operator provides the instruction via the operation unit 31 to drive the piezoactuator 9, then subjects the light source module 3 and the focal spot thereof to reciprocal scanning by repeating in the X-axis direction at a given frequency (such as 30 Hz) and with a sinusoidal waveform of a given amplitude (such as 100 to 300 $\mu$m), and allows the semiconductor laser 1 of the light source module 3 to emit light at a given electric current value. Moreover, the operator provides the instruction via the operation unit 31 to allow the amplification unit 16 to perform the logarithmic amplification. The waveform indicating the optical intensity distribution across the entire amplitude of the reciprocal scanning in the X-axis direction is serially updated and displayed on the oscilloscope 33, for example, in every half cycle of the reciprocal scanning.

In this state, the operator firstly operates the operation unit 31, thereby adjusting the X-axis stage. Thereafter, the operator finds the maximum value of the waveform on the oscilloscope 33, and adjusts the Y-axis stage to render the signal larger. Herein, if a significant peak is found among the waveform observed with the oscilloscope 33, the operator operates the operation unit 31, thereby adjusting the X-axis stage to move the peak in the center of the screen. When the peak in the X-axis direction is deviated from the range of the reciprocal scanning in the X-axis direction by the piezoactuator 9, the inclined waveform is observed. In this case, it is possible to find the peak easily by adjusting the x-axis stage toward the direction where the inclination is high.

When the peak is captured in the range of the reciprocal scanning, the operator adjusts the X-axis stage by operating the operation unit 31 so as to move the peak in the center of the screen.

Next, the Z-axis stage is adjusted to confirm the position where the signal is increased. When the peak position is confirmed, the Z-axis stage is moved further in the same direction. When the signal is constantly decreased, the Z-axis stage is put back to the confirmed peak position, and the position where the signal becomes the maximum is found by adjusting the Y-axis stage.

In the course of moving in the Z-axis stage in one directions there may be a case where the signal is once decreased and turns into an increase again after passing through a position where the signal becomes the minimum. In such a case, a second peak position is confirmed. After confirming the second peak position, the Z-axis stage is put back to the position where the signal becomes the minimum, and the position where the signal becomes the maximum is found by adjusting the Y-axis stage.

An adjusted position in directions of the X, Y, and Z axes is determined by the above-described series of operations. If the core alignment requires higher precision, then adjustment in directions of the X, Y, and Z axes may be carried out once again. In this event, it is preferable that the operator operates the operation unit 31 to allow the amplification unit 16 to perform the linear amplification. Herein, if there is no intention to allow the amplification unit 16 to perform the linear amplification, the amplification unit 16 may be composed of only the logarithmic amplifier 21 as shown in FIG. 3.

When the above-described adjustment is completed, the operator operates the operation unit 31, thereby stopping the reciprocal scanning by the piezoactuator 9. A direct-current voltage is applied to the piezoactuator 9. The operator operates the operation unit 31 as watching a signal level of the amplification unit 16 to be displayed on the oscilloscope 31, whereby the operator adjusts this direct-current voltage such that the level thereof becomes the maximum. Thereafter, the operator completes the core alignment. Herein, instead of applying and adjusting the direct-current voltage, it is possible to adjust the X-axis stage.

In this embodiment, the core alignment is performed by involving the operator. As described above, the operator can adjust the position of the optical fiber 4 based on the one-dimensional optical intensity distribution concerning the X axis by subjecting the light source module 3 to the reciprocal scanning by repeating one-dimensionally in the X-axis direction with the piezoactuator 9. Therefore, according to this embodiment, it is possible to considerably shorten a time period for the core alignment. In addition, the core alignment does not require much skill of the operator.

Note that manual type stages (such as stages enabling the operator to adjust positions by operating adjustment screws or the like) can be also used as the stages 7 and 8. In this case, the stage drive unit 14 becomes unnecessary.

Meanwhile, similar to the third embodiment to be described later, in the assembly apparatus according to this embodiment, a scanning direction of the reciprocal scanning by the piezoactuator 9 may be modified to the Z-axis direction.

(Third Embodiment)

A description will be given of an assembly apparatus for optical components according to a third embodiment.

The assembly apparatus of the third embodiment is equivalent to the assembly apparatus of the above-described first embodiment which is modified as follows. Specifically, in the assembly apparatus of the third embodiment, the scanning direction upon the reciprocal scanning by the piezoactuator 9 is not the X-axis direction but is modified to the Z-axis direction. In this connection, the core alignment operation is also modified. Therefore, FIG. 1 is referred again in the description of the assembly apparatus of the third embodiment.

Now, a description will be given of a core alignment operation using the assembly apparatus of the third embodiment.

Concerning initial position setting when starting the core alignment operation, a description will be given below of the case where mechanical setting errors of the tip portion 4a of the optical fiber 4 relative to the focal point of the light source module 3 remain within the range of about ±250 μm in the Z-axis direction and the range of about ±200 μm in the X-axis and Y-axis directions.

Firstly, the position of the tip portion 4a of the optical fiber 4 is set to a position, which is displaced in advance by about −1000 μm (distant from the light source module 3) in the Z-axis direction and by about −150 μm respectively in the X-axis and Y-axis directions relative to an expected focal point (such a position is a setting position, and an actual position will be further displaced from the setting position by the amounts equivalent to the setting errors), and the core alignment operation is started.

When the core alignment operation is started, the control unit 17 provides an instruction to the piezo drive 12, thereby driving the piezoactuator 9 via the piezo drive unit 12. Accordingly, the control unit 17 subjects the light source module 3 and the focal spot thereof to reciprocal scanning by repeating in the Z-axis direction at a given frequency (such as 30 Hz) and with a sinusoidal waveform of a given amplitude (such as 100 to 300 μm). Moreover, the control unit 17 allows the semiconductor laser 1 of the light source module 3 to emit light at a given electric current value via the light source drive circuit 13. Intensity of outgoing light of the optical fiber 4 is detected by the photodetector 15. An output thereof is amplified by the amplification unit 16 and an output of the amplification unit 16 is supplied to the control unit 17. The control unit 17 provides an amplification mode selection signal to the amplification unit 16 to allow the amplification unit 16 to perform the logarithmic amplification. In this embodiment, the amplification unit 16 is allowed to perform the logarithmic amplification continuously except the case of performing fine adjustment to be described later. Meanwhile, a position detection signal obtained from the position detector 10 via the amplifier circuit 11 is supplied to the control unit 17. The control unit 17 performs A/D conversion of the position detection signal from the amplifier circuit 11 and the output (the amplified optical intensity signal) from the amplification unit 16, and takes in the signal and the output respectively as data. In this way, the control unit 17 serially obtains the optical intensity distribution across the entire amplitude of the reciprocal scanning in the Z-axis direction, for example, in every half cycle of the reciprocal scanning.

Such obtainment of the one-dimensional optical intensity distribution in accordance with the reciprocal scanning in the Z-axis direction by the piezoactuator 9 is serially continued until the time point to be described later.

In this state, position adjustment in the X-axis direction is firstly performed. In this step, concerning the respective pieces of the one-dimensional optical intensity distribution serially obtained as described above, the control unit 17 calculates either an integral value or an average value of the optical intensity in a given range from the optical intensity distribution. Thereafter, the control unit 17 scans the X-axis stage in the positive direction via the stage drive unit 14 as monitoring either the integral value or the average value in the given range of the optical intensity obtained from each piece of the one-dimensional optical intensity distribution. Moreover, the control unit 17 finds the position where the integral value or the average value becomes the maximum (corresponding approximately to the central position in the X-axis direction), and stops the X-axis stage. It can be understood from the optical intensity distribution described with reference to FIG. 4 to FIG. 7 that the position where the integral value or the average value becomes the maximum corresponds approximately to the central position in the X-axis direction. Herein, if readjustment is performed later concerning the X-axis direction as appropriate, instead of the position where the integral value or the average value becomes the maximum, the X-axis stage may be stopped in a position in the vicinity thereof.

Subsequently, position adjustment in the Z-axis direction is performed. In this step, concerning the respective pieces of the one-dimensional optical intensity distribution serially obtained as described above, the control unit 17 calculates any of an integral value, an average value, and a peak value of the optical intensity from the optical intensity distribution. The control unit 17 scans the Z-axis stage in the positive direction via the stage drive unit 14 while monitoring any of the integral value, the average value, and the peak value of the optical intensity obtained from each piece of the one-dimensional optical intensity distribution. Moreover, the control unit 17 confirms that any of the integral value, the average value, and the peak value declines and turns into an increase after indicating the minimum value, puts the Z-axis stage back to the position of the minimum value and stops the Z-axis stage. Herein, instead of the position where any of the integral value, the average value, and the peak value becomes the minimum, it is also possible to stop the Z-axis stage in a position in the vicinity thereof. This is for performing readjustment in the Z-axis direction later.

Subsequently, position adjustment in the Y-axis direction is performed. In this step, concerning the respective pieces of the one-dimensional optical intensity distribution serially obtained as described above, the control unit 17 calculates either a peak value or a half width (which may alternatively be a given ratio width based on another ratio; such an alternative is hereinafter applicable) of the optical intensity from the optical intensity distribution. Thereafter, the control unit 17 scans the Y-axis stage via the stage drive unit 14 as monitoring either the peak value or the half width of the optical intensity obtained from each piece of the one-dimensional optical intensity distribution. Moreover, the control unit 17 finds either a position where the peak value becomes the maximum or a position where the half width becomes the minimum, and then stops the Y-axis stage.

Thereafter, the readjustment in the Z-axis direction is performed. In this step, the control unit 17 determines the shapes of the respective pieces of the one-dimensional optical intensity distribution serially obtained as described above. The control unit 17 scans the Z-axis stage in the direction of an increase in the optical intensity signal. Using the one-dimensional optical intensity distribution, the control unit 17 moves the Z-axis stage to the position where a peak position is located approximately in the center of the amplitude of the reciprocal scanning in the Z-axis direction, and the control unit 17 stops the Z-axis stage.

Lastly, the control unit 17 stops supply of the sinusoidal drive signal to the piezoactuator 9. The control unit 17 scans the Z-axis stage or sweeps a direct-current voltage of the piezoactuator 9 to find the position where the signal obtained from the amplification unit 16 becomes the maximum. The control unit 17 sets the Z-axis stage to the position and completes the core alignment operation.

Herein, in the case of performing the core alignment with higher precision such as a submicron level, it is possible to further enhance resolution in peak-point detection if the control unit 17 switches the amplification unit 16 from the logarithmic amplification mode to the linear amplification mode after completing the initial adjustment in the X-axis direction and the adjustment in the Y-axis direction. Alternatively, in the case of performing the core alignment thoroughly, fine adjustment in the X-axis direction and fine adjustment in the Y-axis direction may be performed for a plurality of times.

The fine adjustment in the X-axis direction is performed as described below, for example. Concerning the respective pieces of the one-dimensional optical intensity distribution serially obtained as described above, the control unit 17 calculates either the peak value or the half width of the optical intensity from the optical intensity distribution. Thereafter, the control unit 17 scans the X-axis stage via the stage drive unit 14 as monitoring either the peak value or the half width of the optical intensity obtained from each piece of the one-dimensional optical intensity distribution. Moreover, the control unit 17 finds either a position where the peak value becomes the maximum or a position where the half width becomes the minimum, and stops the X-axis stage. Note that the fine adjustment in the Y-axis direction can be performed similarly to the fine adjustment in the X-axis direction.

This embodiment also achieves the advantages similar to the aforementioned first embodiment.

(Fourth Embodiment)

Figure 10:
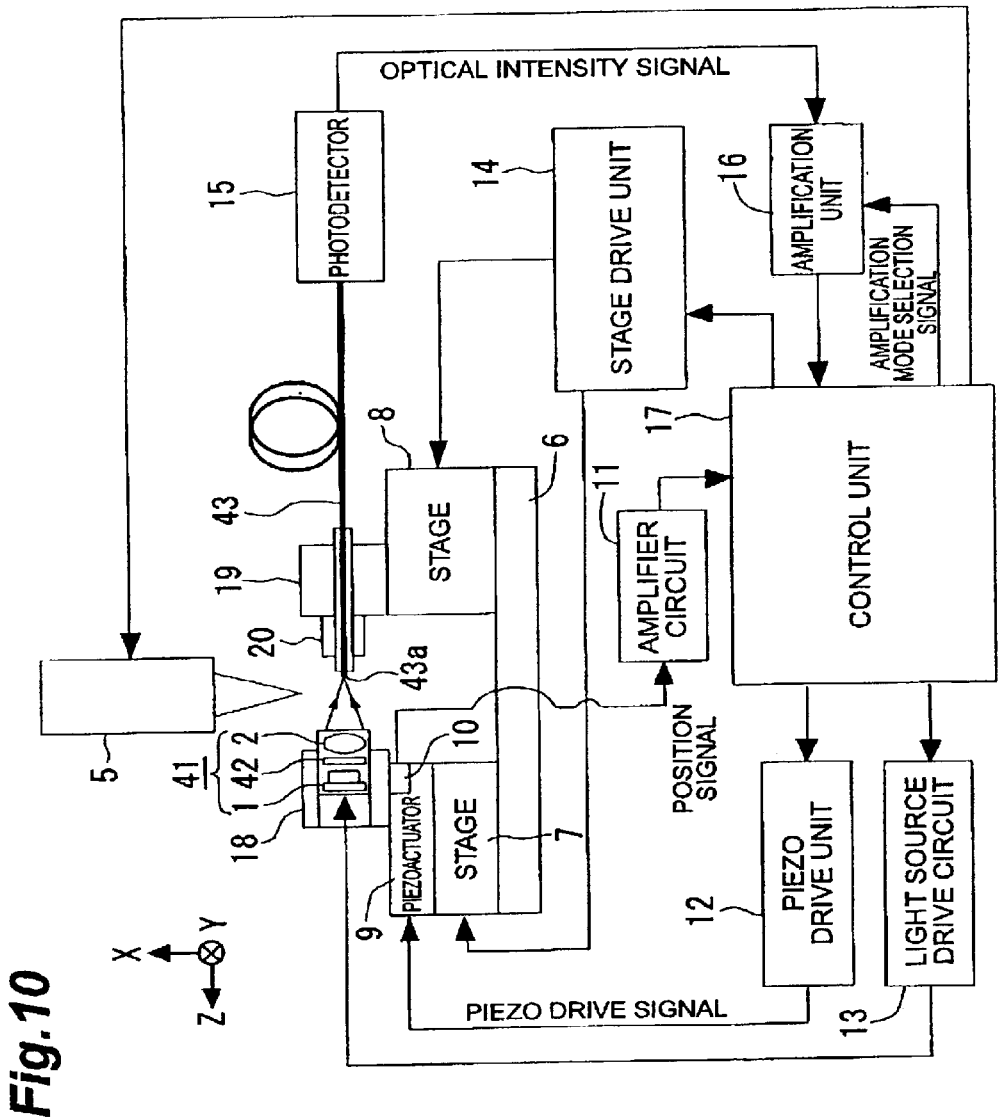
FIG. 10 is a schematic block diagram schematically showing an assembly apparatus for optical components according to a fourth embodiment.

FIG. 10 is a schematic block diagram schematically showing an assembly apparatus for optical components according to a fourth embodiment.

A difference between the assembly apparatus of the fourth embodiment and the assembly apparatus of the first embodiment will be described as follows.

The assembly apparatus of the fourth embodiment is configured as an apparatus for assembling a semiconductor laser module for coupling light of a semiconductor laser 1 with an optical fiber 43 by performing core alignment between a light source module 41 instead of the light source module 3 in FIG. 1 and a single-core polarization maintaining optical fiber 43 instead of the optical fiber 4 in FIG. 4 and joining the both components together with a laser welder 5.

In addition to the semiconductor laser 1 and the condenser lens 2, the light source module 41 includes a polarizer 42 in which a polarization direction is adjusted. The light source module 41 is mounted on the piezoactuator 9 via the holder 18. In this embodiment, the piezoactuator 9 is arranged to perform reciprocal scanning of the light source module 41 in the Z-axis direction relative to the stage 7. Moreover, although it is not illustrated in the drawing, the semiconductor laser 1 and the polarizer 42 of the light source module 41 are fitted to a rotary stage (not shown), which is driven by the stage drive unit 14 under control of the control unit 17 and is rotatable at least 180° in the Zθ direction (in other words, the rotation axis around the Z axis). Herein, this rotary stage will be referred to as the Zθ rotary stage. The polarization maintaining optical fiber 43 is mounted on the stage 8 via the holder 19.

Next, a description will be given of a core alignment operation using the assembly apparatus of the fourth embodiment.

Concerning initial position setting when starting the core alignment operation, a description will be given below of the case where mechanical setting errors of a tip portion 43a of the optical fiber 43 relative to a focal point of the light source module 41 remain within the range of about ±250 $\mu$m in the Z-axis direction and the range of about ±200 $\mu$m in the X-axis and Y-axis directions.

Firstly, the position of the tip portion 43a of the optical fiber 43 is set to a position, which is displaced in advance by about −300 $\mu$m (distant from the light source module 43) in the Z-axis direction and by about −150 $\mu$m respectively in the X-axis and Y-axis directions relative to an expected focal point (such a position is a setting position, and an actual position will be further displaced from the setting position by the amounts equivalent to the setting errors), and the core alignment operation is started.

When the core alignment operation is started, the control unit 17 provides an instruction to the piezo drive 12, thereby driving the piezoactuator 9 via the piezo drive unit 12. Accordingly, the control unit 17 subjects the light source module 41 and the focal spot thereof to reciprocal scanning by repeating in the Z-axis direction at a given frequency (such as 30 Hz) and with a sinusoidal waveform of a given amplitude (such as 300 $\mu$m). Moreover, the control unit 17 allows the semiconductor laser 1 of the light source module 41 to emit light at a given electric current value via the light source drive circuit 13. Intensity of outgoing light of the optical fiber 43 is detected by the photodetector 15. Thereafter, an output thereof is amplified by the amplification unit 16, and an output of the amplification unit 16 is supplied to the control unit 17. The control unit 17 provides an amplification mode selection signal to the amplification unit 16 to allow the amplification unit 16 to perform the logarithmic amplification. In this embodiment, the amplification unit 16 is allowed to perform the logarithmic amplification continuously. Meanwhile, a position detection signal obtained from the position detector 10 via the amplifier circuit 11 is supplied to the control unit 17. The control unit 17 performs A/D conversion of the position detection signal from the amplifier circuit 11 and the output (the amplified optical intensity signal) from the amplification unit 16, and takes in the signal and the output respectively as data. In this way, the control unit 17 serially obtains the optical intensity distribution across the entire amplitude of the reciprocal scanning in the Z-axis direction, for example, in every half cycle of the reciprocal scanning.

Such obtainment of the one-dimensional optical intensity distribution in accordance with the reciprocal scanning in the Z-axis direction by the piezoactuator 9 is serially continued until the time point to be described later.

In this state, position adjustment in the Zθ direction is firstly performed. Specifically, the control unit 17 rotates the Zθ rotary stage within the range of 180° as monitoring the respective pieces of the one-dimensional optical intensity distribution serially obtained as described above. Moreover, the control unit 17 puts the zθ rotary stage back to the position where the optical intensity becomes the maximum, and then fixes the Zθ rotary stage.

Subsequently, position adjustment in the X-axis direction is performed. In this step, concerning the respective pieces of the one-dimensional optical intensity distribution serially obtained as described above, the control unit 17 calculates either a peak value or a half width (which may be alternatively a given ratio width based on another ratio; such an alternative is hereinafter applicable) of the optical intensity from the optical intensity distribution. Thereafter, the control unit 17 scans the X-axis stage via the stage drive unit 14 as monitoring either the peak value or the half width of the optical intensity obtained from each piece of the one-dimensional optical intensity distribution. Moreover, the control unit 17 finds either a position where the peak value becomes the maximum or a position where the half width becomes the minimum, and stops the X-axis stage.

Subsequently, position adjustment in the Y-axis direction is performed. In this step, concerning the respective pieces of the one-dimensional optical intensity distribution serially obtained as described above, the control unit 17 calculates either a peak value or a half width (which may be alternatively a given ratio width based on another ratio; such an alternative is hereinafter applicable) of the optical intensity from the optical intensity distribution. Thereafter, the control unit 17 scans the Y-axis stage via the stage drive unit 14 as monitoring either the peak value or the half width of the optical intensity obtained from each piece of the one-dimensional optical intensity distribution. Moreover, the control unit 17 finds either a position where the peak value becomes the maximum or a position where the half width becomes the minimum, and stops the Y-axis stage.

Next, position adjustment in the Z-axis direction is performed. In this step, the control unit 17 determines the shapes of the respective pieces of the one-dimensional optical intensity distribution serially obtained as described above. The control unit 17 scans the Z-axis stage in the direction of an increase in the optical intensity signal. Using the one-dimensional optical intensity distribution, the control unit 17 moves the Z-axis stage to the position where a peak position is located approximately in the center of the amplitude of the reciprocal scanning in the Z-axis direction, and the control unit 17 stops the Z-axis stage.

Thereafter, readjustment of the position in the Zθ direction is performed. Specifically, the control unit 17 rotates the Zθ rotary stage within the range of 180° as monitoring the respective pieces of the one-dimensional optical intensity distribution serially obtained as described above. Moreover, the control unit 17 puts the Zθ rotary stage back to the position where an optical signal waveform becomes the maximum, and fixes the Zθ rotary stage Lastly, the control unit 17 stops supply of the sinusoidal drive signal to the piezoactuator 9. The control unit 17 scans the Z-axis stage or sweeps a direct-current voltage of the piezoactuator 9 to find the position where the signal obtained from the amplification unit 16 becomes the maximum. Thereafter, the control unit 17 sets the Z-axis stage to the position and completes the core alignment operation.

Note that, in the case of performing the core alignment with higher precision, it is possible to further enhance resolution in peak-point detection if the control unit 17 switches the amplification unit 16 from the logarithmic amplification mode to the linear amplification mode after completing the initial adjustment in the X-axis direction and the adjustment in the Y-axis direction. Alternatively, in the case of performing the core alignment more thoroughly, fine adjustment in the X-axis direction and fine adjustment in the Y-axis direction may be performed for a plurality of times.

The fine adjustment in the X-axis direction is performed as described below, for example. Concerning the respective pieces of the one-dimensional optical intensity distribution serially obtained as described above, the control unit 17 calculates either the peak value or the half width of optical intensity from the optical intensity distribution. Thereafter, the control unit 17 scans the X-axis stage via the stage drive unit 14 as monitoring either the peak value or the half width of the optical intensity obtained from each piece of the one-dimensional optical intensity distribution. Moreover, the control unit 17 finds either a position where the peak value becomes the maximum or a position where the half width becomes the minimum, and stops the X-axis stage. Note that the fine adjustment in the Y-axis direction can be performed similar to the fine adjustment in the X-axis direction.

In the assembly device of the embodiment, when core alignment is completed, the ring-shaped ring joining member 20 is moved to a left direction in FIG. 10, and spot welding is performed between the joining member 20 and light source module 41 and between the joining member 20 and a ferule of optical fiber 43 respectively by pulse laser from a laser welder 5.

This embodiment also achieves the advantages similar to the previously mentioned first embodiment.

As a modified example of this embodiment, it is also possible to adopt the method including the steps of: inserting a detachable quarter-wavelength plate on the back stage of the polarizer 42 of the light source module 41; performing adjustment in the X, Y, and Z axes similarly to the third embodiment in the state of inserting the quarter-wavelength plate; detaching the quarter-wavelength plate and rotating the light source module 41 by use of the Zθ rotary stage; and aligning the polarization direction with the polarization maintaining optical fiber 43.

(Fifth Embodiment)

Figure 11:
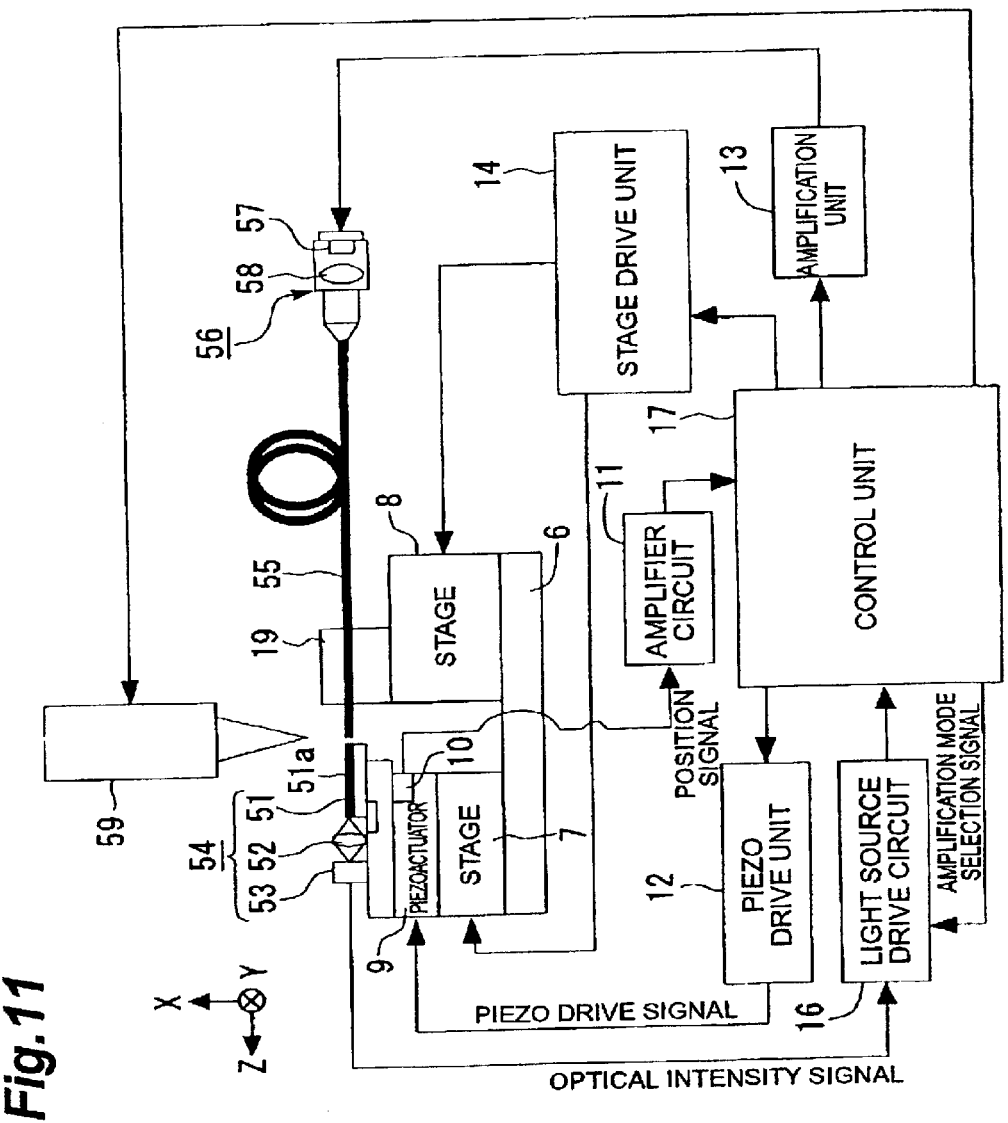
FIG. 11 is a schematic block diagram schematically showing an assembly apparatus for optical components according to a fifth embodiment.

FIG. 11 is a schematic block diagram schematically showing an assembly apparatus for optical components according to a fifth embodiment.

A difference between the assembly apparatus of the fifth embodiment and the assembly apparatus of the first embodiment will be described as follows.

The assembly apparatus of the fifth embodiment is configured as an assembly apparatus for performing core alignment between an incident end face of a waveguide 51a of a waveguide device 51 in a photodetector module 54 instead of the light source module 3 in FIG. 1 and a single-core optical fiber 55 instead of the optical fiber 4 in FIG. 1, and joining the both components together with a bonding machine 59.

The photodetector module 54 includes: a waveguide device 51 having the waveguide 51a; a photodiode 53 which is a photodetector; and a lens 52 for focusing light emitted from an outgoing end face of the waveguide 51a on a photodiode 53. The photodetector module 54 is configured to detect light, which is made incident from the incident end face of the waveguide 51a, with the photodiode 53. An optical intensity signal being an output of the photodiode 53 is amplified by the amplification unit 16 and supplied to the control unit 17. The photodetector module 54 is mounted on the piezoactuator 9. In this embodiment, the piezoactuator 9 is configured to perform reciprocal scanning of the photodetector module 54 in the X-axis direction relative to the stage 7.

The optical fiber 55 is mounted on the stage 8 via the holder 19. A light source module 56 having a semiconductor laser 57 and a condenser lens 58 is disposed at an incident end of the optical fiber 55. The semiconductor laser 57 of the light source module 56 is allowed to emit light in a constant light quantity in response to an electric current supplied from the light source drive circuit 13. The light from the semiconductor laser 57 of the light source module 56 passes through the condenser lens 58 and enters the optical fiber 55 from the incident end of the optical fiber 55, and is emitted from the outgoing end of the optical fiber 55. As shown in FIG. 11, the outgoing end of the optical fiber 55 faces the incident end of the waveguide 51a of the waveguide device 51.

Figure 12:
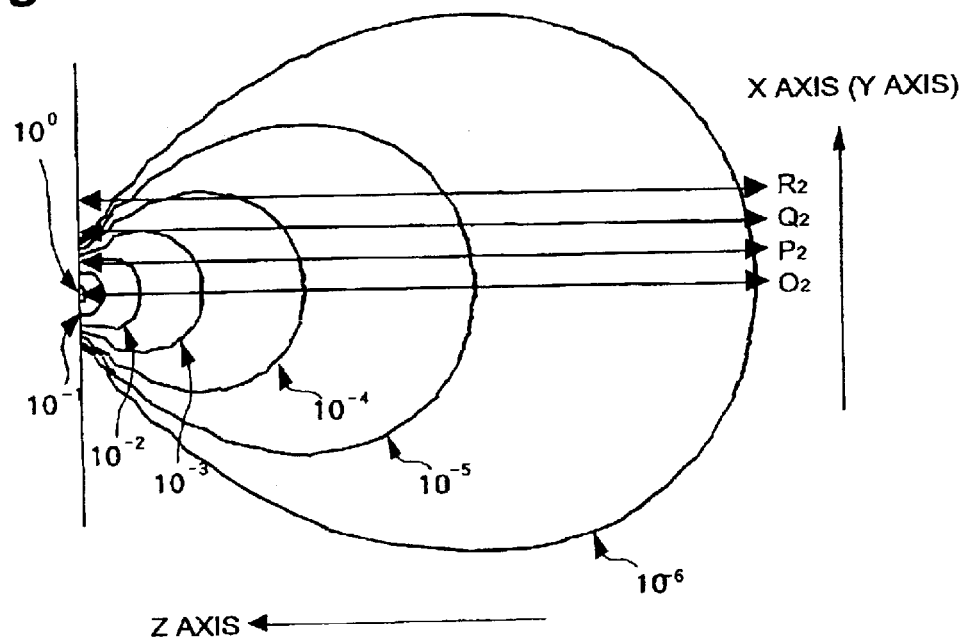
FIG. 12 is still another view schematically showing optical intensity distribution.
Figure 13:
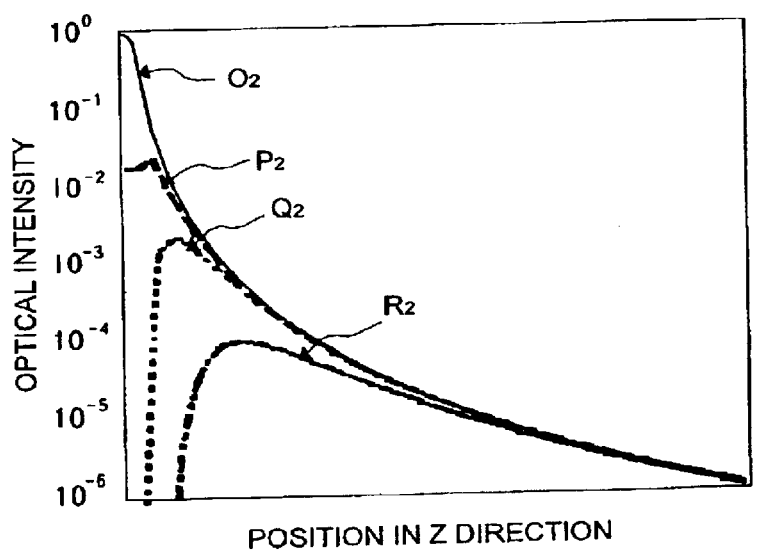
FIG. 13 is a graph showing optical intensity on respective lines indicated in FIG. 12.
Figure 14:
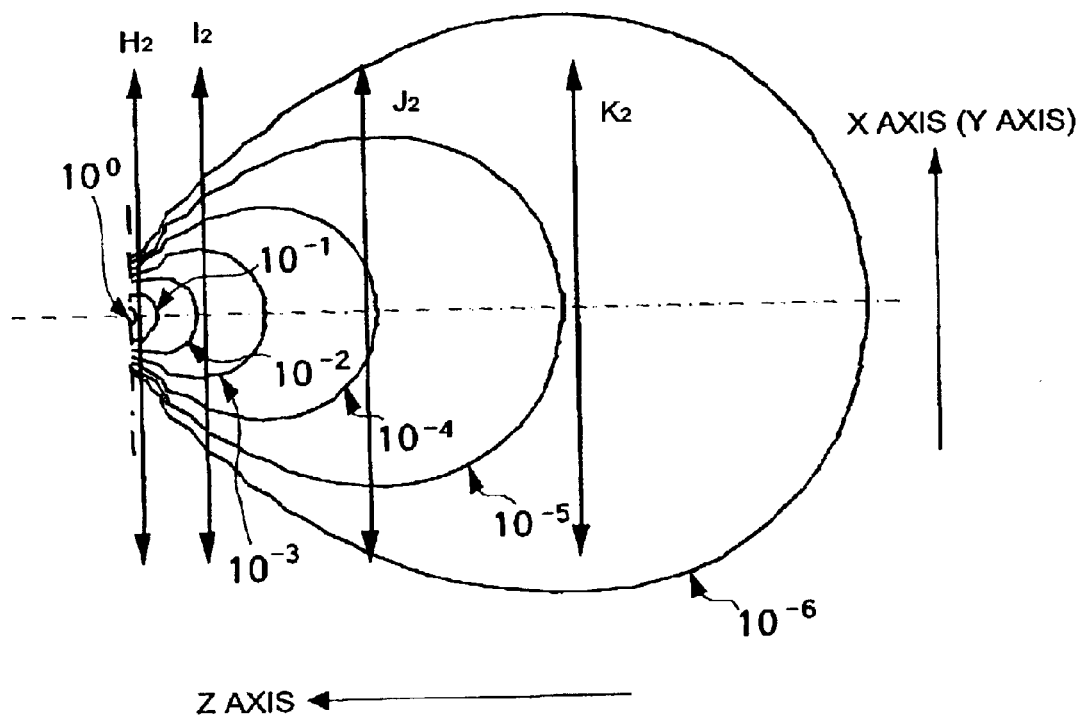
FIG. 14 is yet another view schematically showing optical intensity distribution.
Figure 15:
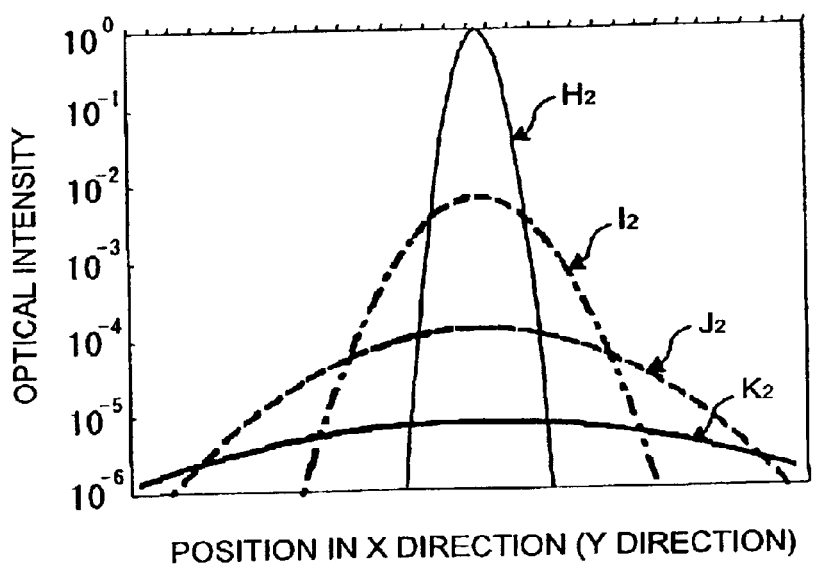
FIG. 15 is a graph showing optical intensity on respective lines indicated in FIG. 14.

Now, a description will be given of intensity distribution of the light emitted from the outgoing end (a light emission point) of the optical fiber 55 with reference to FIG. 12 to FIG. 15. FIG. 12 and FIG. 14 are distribution maps schematically showing optical intensity distribution within a plane which is parallel to an XZ plane (or an YZ plane) and includes the focal position. Note that the optical intensity distribution becomes rotationally symmetric around a straight line which passes through the light emission point and is parallel to the Z axis. FIG. 12 and FIG. 14 are logarithmic displays based on the assumption that the optical intensity emitted from the light emission point expands from the light emission point in accordance with Gaussian distribution, in which the optical intensity at the light emission point is standardized as 1 (=10°) while drawing intensity contour lines of respective digits therein. FIG. 13 is a graph showing aspects of the optical intensity in respective positions in the Z direction position on respective lines $O_2$, $P_2$, $Q_2$, and $R_2$ shown in FIG. 12, which are parallel to the Z axis and mutually displaced along the X direction (or the Y direction). FIG. 15 is a graph showing aspects of the optical intensity in respective positions in the X direction (or the Y direction) on respective lines $H_2$, $I_2$, $J_2$, and $K_2$ shown in FIG. 14, which are parallel to the X axis (or the Y axis) and mutually displaced along the Z direction.

As it is apparent from FIG. 12 to FIG. 15, the light is suddenly attenuated when the light departs from the light emission point. If the linear amplifier 22 is constantly used similar to the conventional technologies, the range of the signal intensity observable at a time remains, for example, two or three digits. Accordingly, the linear amplifier 22 can only observe, for example, the range defined by two or three intensity contour lines in FIG. 12 and FIG. 14 at a time. On the contrary, when the logarithmic amplifier 21 is used therein, it is possible to observe the range from the light emission points of FIG. 12 and FIG. 14 to the outermost intensity contour lines (the intensity contour lines indicating $10^{-6}$) at the same time. In this example, the amplification unit 16 has the same configuration as that of the first embodiment; accordingly, the amplification unit 16 includes the logarithmic amplifier 22.

Next, a description will be given of a core alignment operation using the assembly apparatus of the fifth embodiment.

Concerning initial position setting when starting the core alignment operation, a description will be given below of the case where mechanical setting errors of the outgoing end of the optical fiber 55 remain within the range of about ±250 μm relative to a given setting position in the Z-axis direction and the range of about ±100 μm in the X-axis and Y-axis directions.

Firstly, the position of the outgoing end of the optical fiber 55 is set to a position, which is displaced in advance by about −1500 μm (distant from the incident end of the waveguide 51a) in the Z-axis direction and by about −150 μm respectively in the X-axis and Y-axis directions (such a position is a setting position, and an actual position will be further displaced from the setting position by the amounts equivalent to the setting errors), and the core alignment operation is started.

When the core alignment operation is started, the control unit 17 provides an instruction to the piezo drive unit 12, thereby driving the piezoactuator 9 via the piezo drive unit 12. Accordingly, the control unit 17 subjects the photodetector module 54 including the waveguide 51a to reciprocal scanning by repeating in the X-axis direction at a given frequency (such as 30 Hz) and with a sinusoidal waveform of a given amplitude (such as about 100 μm). Moreover, the control unit 17 allows the semiconductor laser 57 of the light source module 56 to emit light at a given electric current value via the light source drive circuit 13. Intensity of light introduced to the waveguide 51a is detected by the photodiode 53. Accordingly, an output thereof is amplified by the amplification unit 16 and an output of the amplification unit 16 is supplied to the control unit 17. The control unit 17 provides an amplification mode selection signal to the amplification unit 16 to allow the amplification unit 16 to perform the logarithmic amplification. In this embodiment, the amplification unit 16 is allowed to perform the logarithmic amplification continuously. Meanwhile, a position detection signal obtained from the position detector 10 via the amplifier circuit 11 is supplied to the control unit 17. The control unit 17 performs A/D conversion of the position detection signal from the amplifier circuit 11 and the output (the amplified optical intensity signal) from the amplification unit 16, and takes in the signal and the output respectively as data. In this way, the control unit 17 serially obtains the optical intensity distribution across the entire amplitude of the reciprocal scanning in the X-axis direction, for example, in every half cycle of the reciprocal scanning.

Such obtainment of the one-dimensional optical intensity distribution in accordance with the reciprocal scanning in the X-axis direction by the piezoactuator 9 is serially continued until the time point to be described later.

In this state, position adjustment in the X-axis direction is firstly performed. In this step, concerning the respective pieces of the one-dimensional optical intensity distribution serially obtained as mentioned previously, the control unit 17 calculates either an integral value or an average value of the optical intensity in a given range from the optical intensity distribution. Accordingly, the control unit 17 scans the X-axis stage in the positive direction via the stage drive unit 14 as monitoring either the integral value or the average value in the given range of the optical intensity obtained from each piece of the one-dimensional optical intensity distribution. Moreover, the control unit 17 finds the position where the integral value or the average value becomes the maximum (corresponding approximately to the central position in the X-axis direction), and stops the X-axis stage. It can be understood from the optical intensity distribution described with reference to FIG. 12 to FIG. 15 that the position where the integral value or the average value becomes the maximum corresponds approximately to the central position in the X-axis direction.

Subsequently, position adjustment in the Y-axis direction is performed. In this step, concerning the respective pieces of the one-dimensional optical intensity distribution serially obtained as described above, the control unit 17 calculates either an integral value or an average value of the optical intensity in a given range from the optical intensity distribution. Thereafter, the control unit 17 scans the Y-axis stage in the positive direction via the stage drive unit 14 as monitoring either the integral value or the average value in the given range of the optical intensity obtained from each piece of the one-dimensional optical intensity distribution. Moreover, the control unit 17 finds the position where the integral value or the average value becomes the maximum (corresponding approximately to the central position in the Y-axis direction), and stops the Y-axis stage. It can be understood from the optical intensity distribution described with reference to FIG. 12 to FIG. 15 that the position where the integral value or the average value becomes the maximum corresponds approximately to the central position in the Y-axis direction.

Next, the control unit 17 moves the Z-axis stage by about 1000 μm in the direction to bring the optical fiber 55 and the waveguide 51a close to each other. In this event, if the one-dimensional optical intensity distribution shows a trapezoidal shape, the control unit 17 moves the X-axis stage to the position where the trapezoidal waveform is located approximately in the center of the amplitude of the reciprocal scanning in the X-axis direction by the piezoactuator 9. If the waveform is not trapezoidal but asymmetric, the control unit 17 scans the X-axis stage toward the direction to render the signal larger, and moves the X-axis stage to the position where the trapezoidal waveform is located approximately in the center of the amplitude of the reciprocal scanning in the X-axis direction by the piezoactuator 9.

Next, the control unit 17 adjusts the position in the Y-axis direction again as monitoring either the integral value or the average value of the one-dimensional optical intensity distribution, thereby moving the Y-axis stage to the position where either the integral value or the average value becomes the maximum.

Figure 16:
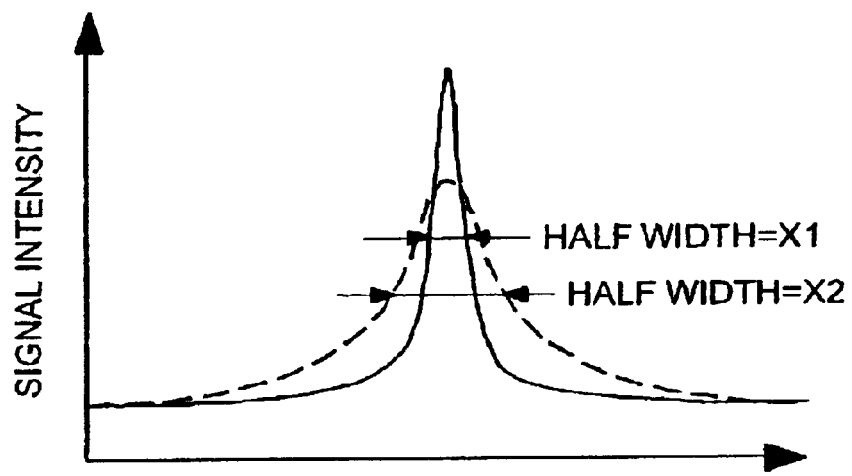
FIG. 16 is a graph showing an aspect of variation in one-dimensional optical intensity distribution.
Figure 17:
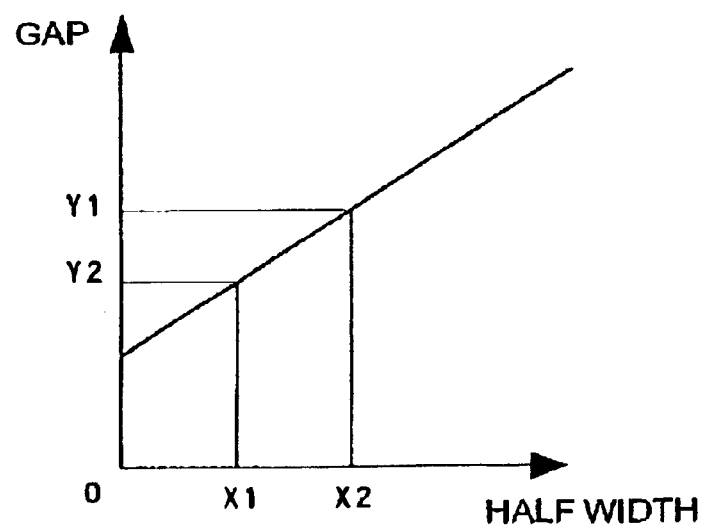
FIG. 17 is a graph showing a relation between a gap and a half width.

Next, the control unit 17 gradually brings the optical fiber 55 closer to the waveguide 51a by use of the Z-axis stage. Accordingly, as shown in FIG. 16, peak intensity of the signal in the one-dimensional optical density distribution is gradually increased and the width of the waveform (the half width) is reduced. As shown in FIG. 17 as an example, there is a certain relation between a gap length between the outgoing end of the optical fiber 55 and the incident end of the waveguide 51a, and, the width of the waveform (the half width). Accordingly, movement of the Z-axis stage is stopped at a time point of reaching a given width.

Thereafter, the control unit 17 stops supply of the sinusoidal drive signal to the piezoactuator 9. Accordingly, the control unit 17 scans the X-axis stage or sweeps a direct-current voltage of the piezoactuator 9 to find the position where the signal obtained from the amplification unit 16 becomes the maximum. Accordingly, the control unit 17 sets the X-axis stage to the position.

Next, the control unit 17 moves the Z-axis stage by a given distance and strikes the outgoing end of the optical fiber 55 at the incident end of the waveguide 51a.

Thereafter, the control unit 17 fixes the outgoing end of the optical fiber 55 and the incident end of the waveguide 51a with solder or an adhesive by use of the bonding machine 59. In this way, assembly is completed.

Herein, the method of this embodiment is also applicable to the core alignment between a waveguide end face of the waveguide device and a semiconductor laser chip. In this case, however, the control unit 17 stops supply of the sinusoidal drive signal to the piezoactuator 9 in the event of determination of a gap length between the waveguide end face and the semiconductor laser chip. Accordingly, the control unit 17 scans the X-axis stage or sweeps a direct-current voltage of the piezoactuator 9 to find the position where the signal obtained from the amplification unit 16 becomes the maximum. Thereafter, the control unit 17 sets the X-axis stage to the position. Herein, a strike of the both components does not take place.

In this embodiment, a scanning direction of the reciprocal scanning by the piezoactuator 9 is set to the X-axis direction. However, the scanning direction may be modified to, for example, the Y-axis direction.

(Sixth Embodiment)

Figure 18:
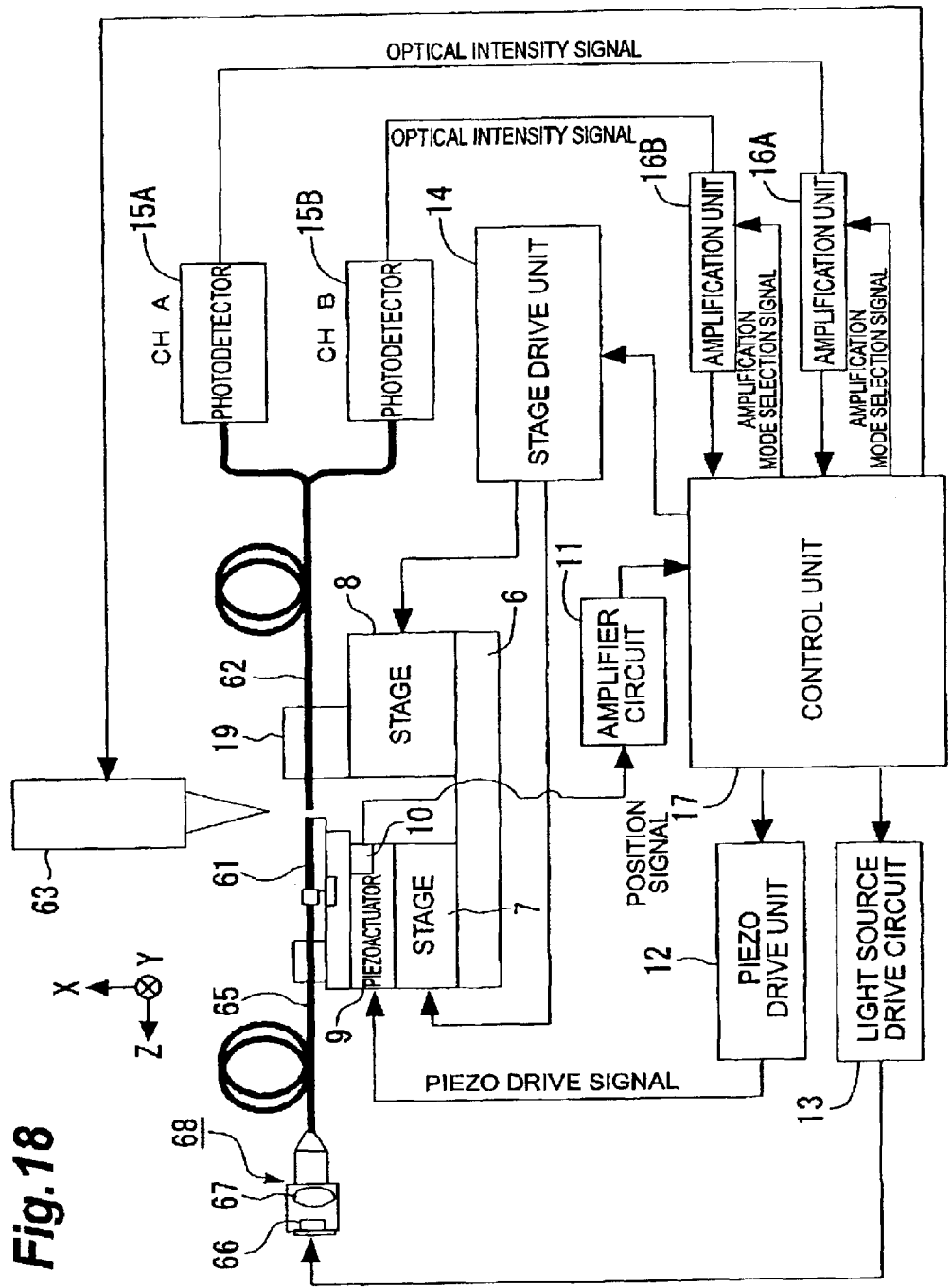
FIG. 18 is a schematic block diagram schematically showing an assembly apparatus for optical components according to a sixth embodiment.
Figure 19:
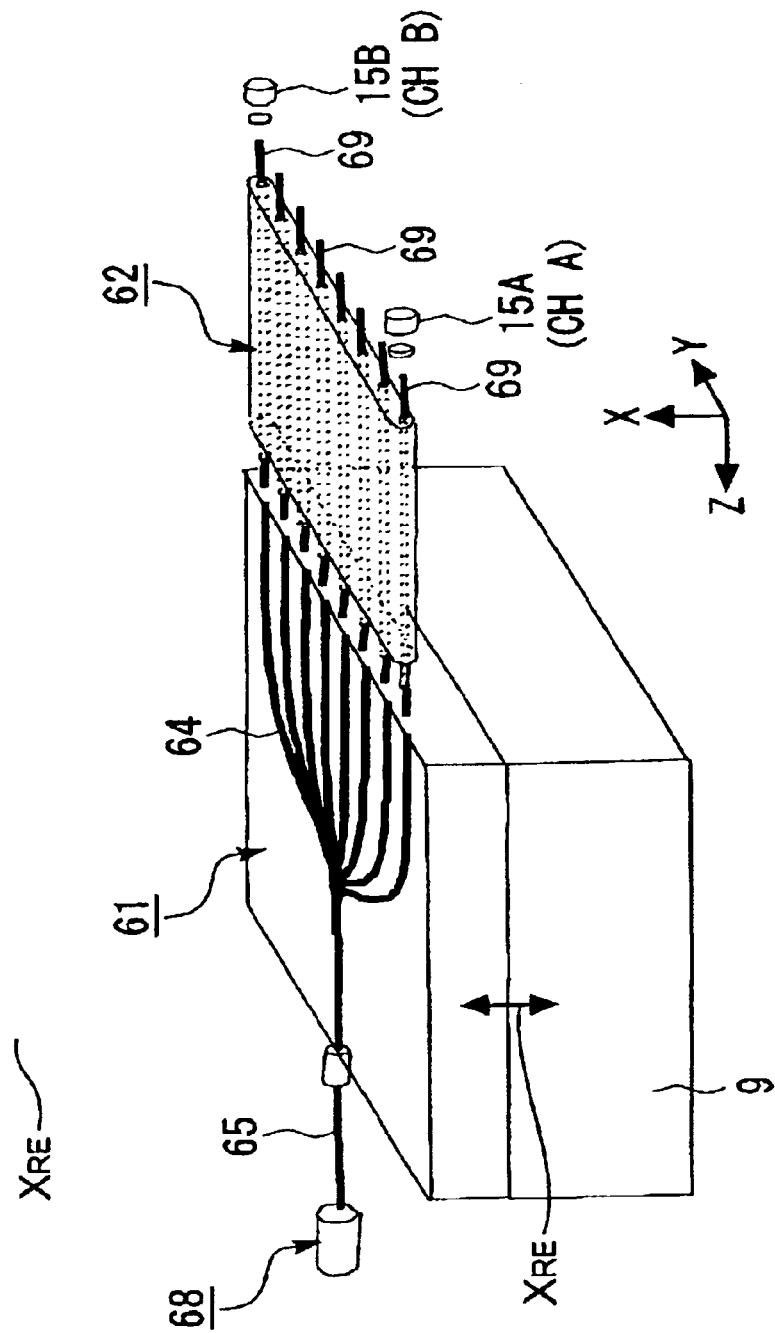
FIG. 19 is a schematic perspective view schematically showing the assembly apparatus for optical components according to the sixth embodiment.
Figure 20:
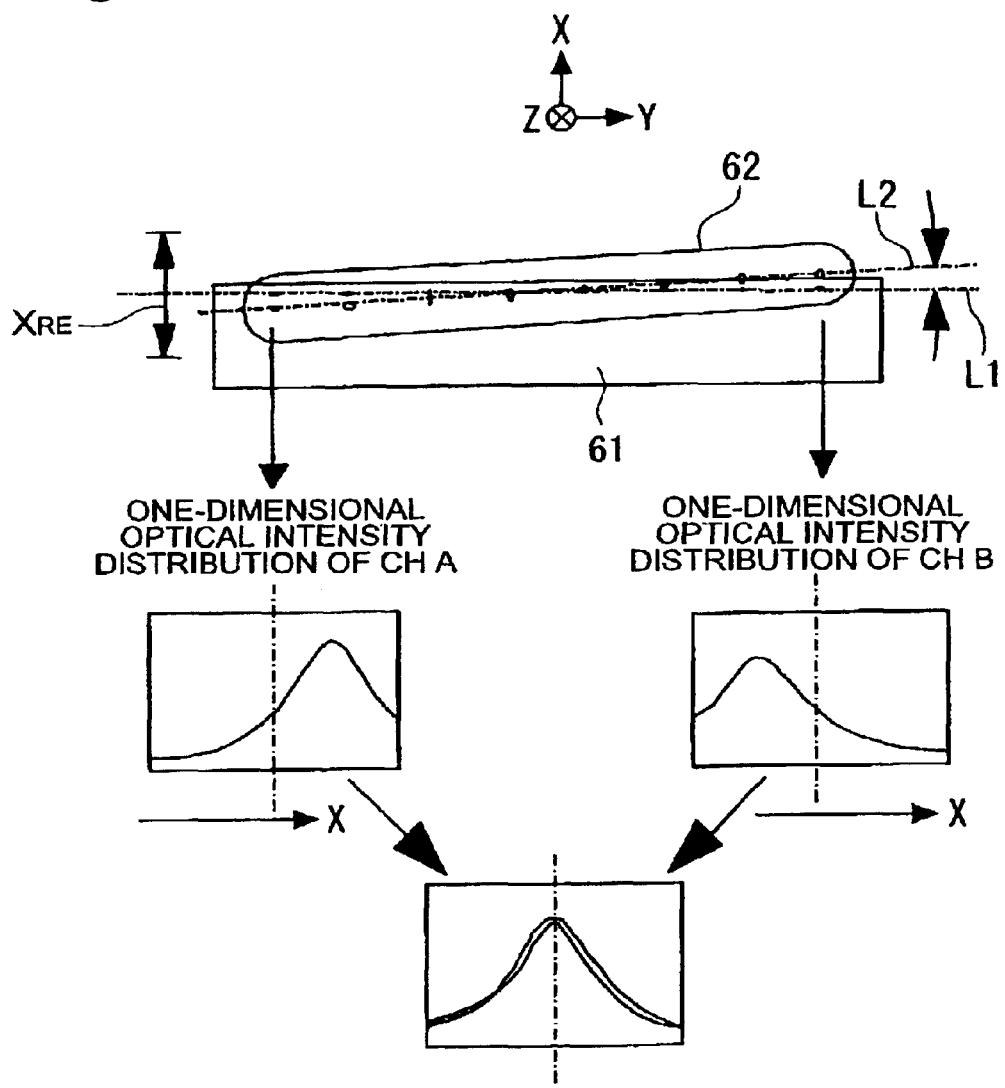
FIG. 20 is a view schematically showing the principle of the core alignment with respect to an inclination in the assembly apparatus for optical components according to the sixth embodiment.

FIG. 18 is a schematic block diagram schematically showing an assembly apparatus for optical components according to a sixth embodiment. FIG. 19 is a schematic perspective view schematically showing the assembly apparatus for optical components according to the sixth embodiment. FIG. 20 is a view schematically showing the principle of the core alignment concerning an inclination in the assembly apparatus for optical components according to the sixth embodiment.

A difference between the assembly apparatus of the sixth embodiment and the assembly apparatus of the first embodiment will be described as follows.

The assembly apparatus of the sixth embodiment is configured as an assembly apparatus for performing core alignment between a waveguide device 61 instead of the light source module 3 in FIG. 1 and a ribbon optical fiber 62 instead of the optical fiber 4 in FIG. 1, and joining the both components together with a bonding machine 63.

As shown in FIG. 19, the waveguide device 61 includes a branched waveguide 64 having the configuration that one waveguide (which will be referred to as a "pre-branch waveguide" for convenience of explanation) is branched into a plurality of waveguides (which will be referred to as "post-branch waveguides" for convenience of explanation). End faces of the plurality of the post-branch waveguides of the branched waveguide 64 are arranged in a given pitch on a straight line L1 as shown in FIG. 19 and FIG. 20. Thus, the end faces constitute regions which are capable of respectively emitting light along mutually parallel optical axes.

The waveguide device 61 is mounted on the piezoactuator 9. One end of the optical fiber 65 is coupled with the end face of the pre-branch waveguide of the waveguide device 61. A light source module 68 having a semiconductor laser 66 and a condenser lens 67 is disposed on the other end of the optical fiber 65. The semiconductor laser 66 of the light source module 68 is allow to emit light in a constant light quantity in response to an electric current supplied from the light source drive circuit 13. The light from the semiconductor laser 66 passes through the condenser lens 57 and the optical fiber 65. Accordingly, the light is made incident to the pre-branch waveguide of the branched waveguide 64 and is emitted respectively from the plurality of post-branch waveguides of the branched waveguide 64.

As shown in FIG. 19, the ribbon optical fiber 62 includes a plurality of core optical fibers 69. End faces on one side of the plurality of core optical fibers 69 are arranged in the same pitch as the given pitch on a straight line L2 as shown in FIG. 19 and FIG. 20. Thus, the end faces constitute regions which are capable of respectively introducing light along mutually parallel optical axes. A portion on one side of the ribbon optical fiber 62 is mounted on the stage 8 with the holder 19. The end faces on the one side of the plurality of core optical fibers 69 respectively face the plurality of end faces of the post-branch waveguides in the branched waveguide 64 of the waveguide device 61.

Photodetectors 15A and 15B are respectively disposed on the other ends of two core optical fibers 69 on both sides of the ribbon optical fiber 62. The light respectively emitted from end faces of two post-branch waveguides on both sides of the branched waveguide 64 of the waveguide device 61 passes through the two core optical fibers 69 on the both sides of the ribbon optical fiber 62, and is detected respectively by the photodetectors 15A and 15B. Respective outputs of the photodetectors 15A and 15B are respectively amplified by amplification units 16A and 16B and supplied to the control unit 17. Each of the amplification units 16A and 16B has the same configuration as the amplification unit 16 in the first embodiment. Each of the amplification units 16A and 16B includes the logarithmic amplifier 22.

Moreover, in this embodiment, the stage 8 has an adjustment mechanism for the Zθ rotation axis in addition to the X, Y, and Z axes. Specifically, the stage 8 is configured as a combination of an X-axis stage, a Y-axis stage, a Z-axis stage, and a Zθ-rotation-axis stage. However, illustration of the X-axis stage, the Y-axis stage, the Z-axis stage, and the Zθ-rotation-axis stage is omitted herein.

Next, a description is given of a core alignment operation using the assembly apparatus of the sixth embodiment.

When the core alignment operation is started, the control unit 17 provides an instruction to the piezo drive 12, thereby driving the piezoactuator 9 via the piezo drive unit 12. Accordingly, the control unit 17 subjects the waveguide device 61 to reciprocal scanning (as indicated with arrows $X_{RE}$ in FIG. 19 and FIG. 20) by repeating in the X-axis direction at a given frequency (such as about 30 Hz) and with a sinusoidal waveform of a given amplitude (such as 100 to 300 μm (±50 to 150 μm)). Moreover, the control unit 17 allows the semiconductor laser 66 of the light source module 68 to emit light at a given electric current value via the light source drive circuit 13. Intensity of light respectively introduced to two core optical fibers 69 on the both sides of the ribbon optical fiber 62 is respectively detected by the photodetectors 15A and 15B. Accordingly, outputs thereof are amplified by the amplification units 16A and 16B, and outputs of the amplification units 16A and 16B are supplied to the control unit 17. The control unit 17 provides amplification mode selection signals to the amplification units 16A and 16B to allow the amplification units 16A and 16B to perform the logarithmic amplification. In this embodiment, the amplification unit 16 is allowed to perform the logarithmic amplification continuously. Meanwhile, a position detection signal obtained from the position detector 10 via the amplifier circuit 11 is supplied to the control unit 17. The control unit 17 performs A/D conversion of the position detection signal from the amplifier circuit 11 and the outputs (the amplified optical intensity signals) from the amplification units 16A and 16B, and takes in the signal and the outputs respectively as data. In this way, the control unit 17 serially obtains one-dimensional optical intensity distribution across the entire amplitude of the reciprocal scanning in the X-axis direction corresponding respectively to the photodetectors 15A and 15B in, for example, every half cycle of the reciprocal scanning. A channel corresponding to the photodetector 15A will be referred to as the channel A (CH A), and a channel corresponding to the photodetector 15B will be referred to as the channel B (CH B), respectively.

Such obtainment of the one-dimensional optical intensity distribution in accordance with the reciprocal scanning in the X-axis direction by the piezoactuator 9 is serially continued until the time point to be described later.

In this state, the control unit 17 firstly adjusts the Z-axis stage to bring the ribbon fiber 62 close to the waveguide device 61 within a mechanically safe range.

In this event, if right and left ends of the waveguide device 61 and the ribbon fiber 62 remain within about ±50 μm relative to the X axis, aspects of the one-dimensional optical distribution of the respective channels CH A and CH B respectively obtained corresponding to the photodetectors 15A and 15B are rendered as shown in FIG. 20.

In this event, if the straight line L1 of the waveguide device 61 is inclined against the straight line L2 of the ribbon fiber 62, peak positions of the respective pieces of the one-dimensional optical intensity distribution are mutually displaced and deviated. The control unit 17 calculates the peak positions of the two pieces of the one-dimensional optical intensity distribution, and adjusts the angle by use of the Zθ rotary stage to substantially eliminate the deviation between the both peak positions.

Herein, according to this embodiment, even if the peak positions of the one-dimensional optical intensity distribution do not remain within the range of the amplitude of the reciprocal scanning in the X-axis direction by the piezoactuator 9 due to the smallness of amplitude of the reciprocal scanning in the X-axis direction by the piezoactuator 9, the largeness of mechanical setting errors of the components or the like, it is still possible to judge, by an inclination of a hem in the waveform of the obtained one-dimensional optical intensity distribution, as to which direction of the amplitude of the reciprocal scanning each of the peak positions is displaced to. Accordingly, the control unit 17 can easily adjust the angle by adjusting the Zθ-axis stage and the X-axis stage toward the direction of manifestation of the peak based on a result of this judgment.

Next, the control unit 17 scans the Y-axis stage. Moreover, the control unit 17 finds a Y-axis position where peak intensity of the one-dimensional optical intensity distribution of each channel becomes the maximum, and stops the Y-axis stage to the position. In this event, if the positions on the Y axis where the maximum values are obtained are deviated between the right and left channels, then adjustment is made to adopt an intermediate position thereof, or to equalize the two pieces of the peak intensity.

After completing the Y-axis adjustment, the control unit 17 scans the Z-axis stage to bring the ribbon fiber closer to the waveguide, and stops movement of the stage in a given distance. In this event, similar to the issues already described with reference to FIG. 16 and FIG. 17, the distance between the waveguide device 61 and a tip of the ribbon fiber 62 can be determined by the half width and the like obtained from the one-dimensional optical intensity distribution.

Next, the control unit 17 stops supply of the sinusoidal drive signal to the piezoactuator 9. Accordingly, the control unit 17 scans the X-axis stage or sweeps a direct-current voltage of the piezoactuator 9 to find the position where the signal obtained from any one of the amplification units 16A and 16B becomes the maximum. Thereafter, the control unit 17 sets the X-axis stage to the position. Thereafter, the control unit 17 moves the Z-axis stage by a given distance. Accordingly, the control unit 17 strikes the ribbon optical fiber 62 at the waveguide device 61 or sets the both components in the minimum distance.

Thereafter, the control unit 17 fixes the ends of the ribbon optical fiber 62 and the ends of the waveguide device 61 together with an adhesive or the like by use of the bonding machine 63. In this way, assembly is completed.

In the above-described embodiment, the optical intensity is detected in terms of the two core optical fibers 69 on the both sides among the plurality of core optical fibers 69 of the ribbon optical fiber 62. However, it is also possible to detect the optical intensity in terms of more than two of any arbitrary number of the core optical fibers 69. If the ribbon optical fiber 62 has multiple cores, for example, ranging from 16 to 32 fibers, it is still possible to detect the optical intensity in terms all the core optical fibers 69 respectively.

(Seventh Embodiment)

Figure 21:
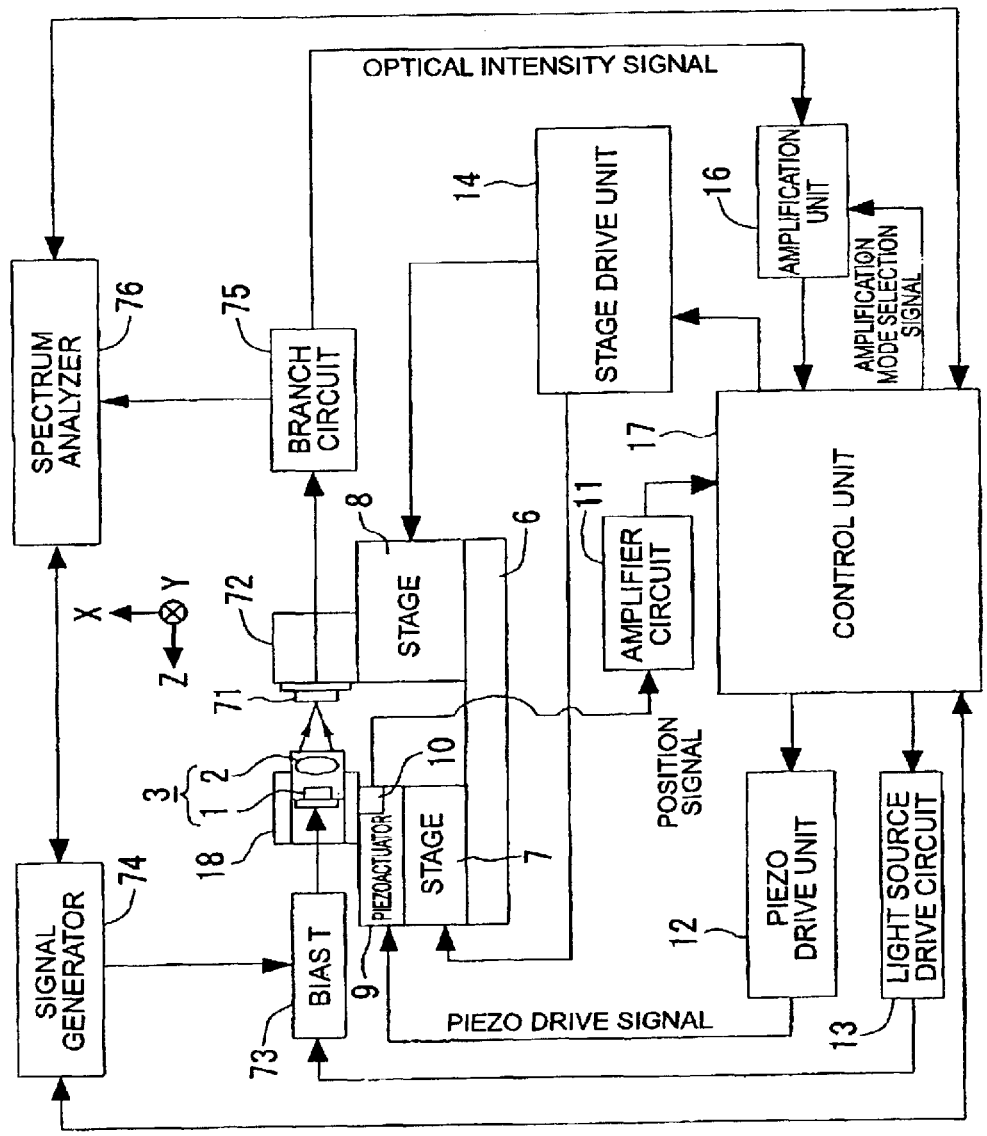
FIG. 21 is a schematic block diagram schematically showing a high-frequency property measuring apparatus according to a seventh embodiment.

FIG. 21 is a schematic block diagram schematically showing a high-frequency property measuring apparatus according to a seventh embodiment.

A difference between the high-frequency property measuring apparatus of the seventh embodiment and the assembly apparatus of the first embodiment will be described as follows.

The high-frequency property measuring apparatus of the seventh embodiment is configured as a high-frequency property measuring apparatus for measuring a high-frequency property of a high-speed photodiode which is a photodetector.

In the high-frequency property measuring apparatus of the seventh embodiment, a photodiode 71 which is a target for measurement is mounted on the stage 8 via a holder 72, instead of the optical fiber 4 in FIG. 1. The photodiode 71 faces the light source module 3. Moreover, in the apparatus shown in FIG. 21, a bias T 73, a signal generator 74, a branch circuit 75, and a spectrum analyzer 76 are provided instead of the laser welder 5 and the photodetector 15.

The photodiode 71 detects laser beam intensity which is made incident from the light source module 3. An output of the photodiode 71 is branched into two by the branch circuit 75, and one of the branched outputs is amplified by the amplification unit 16 and sent to the control unit 17. The other output branched by the branch circuit 75 is sent to the spectrum analyzer 76, and a frequency characteristic thereof and the like are measured by the spectrum analyzer and the like. The semiconductor laser 1 of the light source module 3 is modulated by the signal generator 74 through the bias T 73.

In the high-frequency property measuring apparatus of the seventh embodiment, the photodiode 71 is aligned with respect to the focal point of the light source module 3 by a core alignment operation similar to the previously mentioned core alignment operation using the apparatus shown in FIG. 1.

Figure 22:
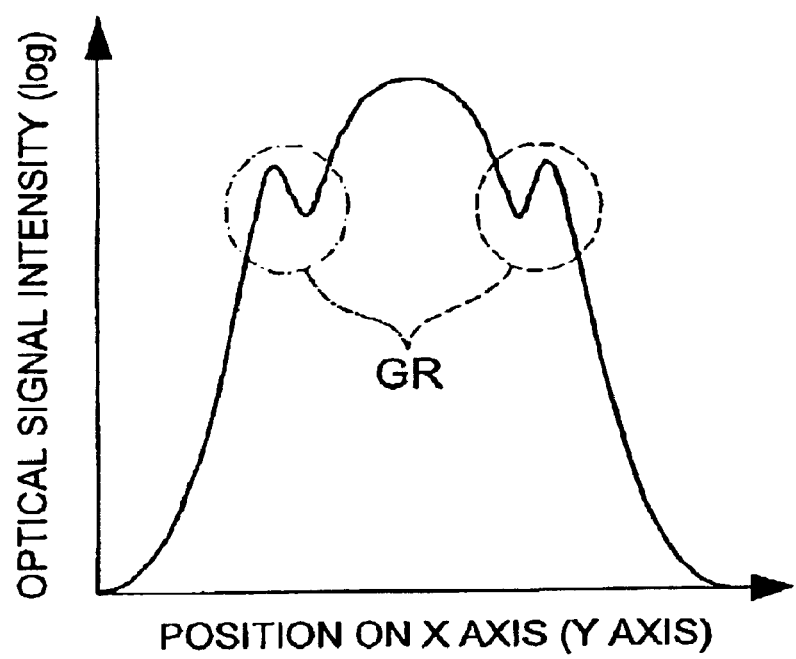
FIG. 22 is a graph for explaining an effect by a guard ring.

Herein, a light receiving area of the photodiode 71 usually has a diameter of about several tens of micrometers, which is larger than the focal spot of the light source module 3. Moreover, there is unevenness of sensitivity within the light receiving area as well. Accordingly, there may be a case where a peak point of one-dimensional optical intensity cannot be determined clearly. In this case, it is possible to align with the center of a half value of amplitude or with a position of the center of gravity relative to the maximum value of a signal. Alternatively, it is also possible to use a method of finding a central position with reference to guard ring positions (GR in FIG. 22) provided on a light receiving plane of the photodiode 71.

After completing the core alignment, the control unit 17 controls the signal generator 74 to sweep an oscillation frequency, and measures the frequency characteristic of the photodiode 71 by use of the spectrum analyzer 76 and the like.

Although a description has been given of respective embodiments of the present invention, it is to be understood that the present invention shall not be limited only to the embodiments described herein.

For example, the modification contemplated for obtaining the apparatus shown in FIG. 9 by modifying the apparatus shown in FIG. 1 may be also applied to the apparatus shown in FIG. 10, the apparatus shown in FIG. 11, the apparatus shown in FIG. 18, and the apparatus shown in FIG. 21, respectively. In this way, it is also possible to configure an apparatus corresponding to any of those apparatus, which relies on judgment of the operator or the like. If such a modification is applied to the apparatus shown in FIG. 18, it is possible to provide each of the amplification units 16A and 16B with an oscilloscope independently. However, it is more preferable to use a two-channel oscilloscope in this case.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method for core alignment between optical components for adjusting relative positions between a first optical component and a second optical component, wherein amplification means is used for amplifying an output of a photodetector configured to detect light being emitted from said first optical component and introduced to said second optical component, and the method includes:

an optical intensity distribution obtaining step of subjecting said first and second optical components relatively to reciprocal scanning by repeating one-dimensionally concerning one axis and obtaining one-dimensional optical intensity distribution concerning said one axis based on the output of said amplification means obtained in accordance with said reciprocal scanning; and a position adjusting step of moving a central position of said reciprocal scanning to a given direction adjusting the relative positions between said first and second optical components based on a change in said one-dimensional optical intensity distribution obtained in said optical intensity distribution obtaining step with movement of the central position of said reciprocal scanning.

2. The method for core alignment between optical components according to claim 1, wherein said amplification means is allowed to perform logarithmic amplification.

3. The method for core alignment between optical components according to claim 1, wherein said amplification means is allowed to perform logarithmic amplification before the relative position approaches a core alignment position, and said amplification means is allowed to perform linear amplification after the relative position approaches the core alignment position.

4. The method for core alignment between optical components according to claim 1, wherein said position adjusting step further includes the steps of:

obtaining any of an integral value and an average value in a given range of the optical intensity from said one-dimensional optical intensity distribution;

moving the central position of said reciprocal scanning to the given direction being approximately perpendicular to an optical axis of the light emitted from said first optical component; and stopping movement to said given direction at any of a position where any one of said integral value and said average value becomes maximum and a position in the vicinity thereof.

5. The method for core alignment between optical components according to claim 1, wherein said position adjusting step further includes the steps of:

obtaining any of a peak value and a given ratio width of the optical intensity from said one-dimensional optical intensity distribution;

moving the central position of said reciprocal scanning to the given direction; and stopping movement to said given direction at any of a position of any one of a point where said peak value becomes the maximum and a point in the vicinity thereof, and a position of any one of a point where said given ratio width becomes the minimum and a point in the vicinity thereof.

6. The method for core alignment between optical components according to claim 1, wherein the light emitted from said first optical component is light to be focused on a focal point, and said position adjusting step further includes the steps of:

obtaining any one of an integral value, an average value, and a peak value of optical intensity from said one-dimensional optical intensity distribution; and moving the central position of said reciprocal scanning to a first direction while offsetting the central position to a second direction being approximately perpendicular to said first direction approximately coincident with a direction of an optical axis of the light emitted from said first optical component and stopping the movement to said first direction at any of a position where any one of said integral value, said average value, and said peak value becomes the minimum and a position in the vicinity thereof.

7. The method for core alignment between optical components according to claim 1, wherein said position adjusting step further includes the steps of:

obtaining any of a peak value and a given ratio width of the optical intensity from the one-dimensional optical intensity distribution;

moving the central position of the reciprocal scanning to the given direction approximately perpendicular to a direction of an optical axis of the light emitted from said first optical component; and stopping the movement to said given direction at any of a position where any one of said peak value and said given ratio width becomes a given value and a position in the vicinity thereof.

8. A method for core alignment between optical components for adjusting relative positions between a first optical component and a second optical component, wherein said first optical component includes a plurality of regions being arranged on an approximately straight line and capable of respectively emitting light mutually parallel along an optical axis, said second optical component includes a plurality of regions being arranged on an approximately straight line and capable of respectively allowing light to be incident, at least two pieces of amplification means are used for amplifying outputs corresponding to at least two photodetectors for respectively detecting light being respectively emitted from at least two corresponding regions from the plurality of regions of said first optical component and respectively introduced to at least two corresponding regions from the plurality of regions of said second optical component, and the method includes:

an optical intensity distribution obtaining step of subjecting said first and second optical components relatively to reciprocal scanning by repeating one-dimensionally concerning one axis and obtaining one-dimensional optical intensity distribution concerning said one axis for each output respectively based on each of the outputs of at least the two pieces of said amplification means obtained in accordance with said reciprocal scanning; and a position adjusting step of moving a central portion of said reciprocal scanning to a given direction and adjusting the relative positions between said first and second optical components based on a change in respective pieces of said one-dimensional optical intensity distribution obtained in said optical intensity distribution obtaining step to reduce a variation of peak positions of the respective pieces of said one-dimensional optical intensity distribution with movement of the central position of said reciprocal scanning.

9. An apparatus for core alignment between optical components for adjusting relative positions between a first optical component and a second optical component, the apparatus comprising:

amplification means for amplifying an output of a photodetector configured to detect light being emitted from said first optical component and introduced to said second optical component;

moving means for changing the relative positions between said first and second optical components;

controlling means for controlling said moving means to adjust the relative positions based on an output of said amplification means; and reciprocally scanning means for subjecting said first and second optical components relatively to reciprocal scanning by repeating one-dimensionally concerning one axis, wherein said controlling means obtains one-dimensional optical intensity distribution concerning said one axis based on the output of said amplification means being obtained in accordance with said reciprocal scanning, and said controlling means controls said moving means to adjust the relative positions between said first and second optical components based on said obtained one-dimensional optical intensity distribution.

10. The apparatus for core alignment between optical components for adjusting relative positions between a first optical component and a second optical component according to claim 9, wherein said amplification means performs logarithmic amplification.

11. The apparatus for core alignment between optical components for adjusting relative positions between a first optical component and a second optical component according to claim 9, wherein said amplification means selectively performs any of logarithmic amplification and linear amplification in response to a selection signal, and said controlling means provides the selection signal to said amplification means to allow said amplification means to perform said logarithmic amplification before the relative position approaches a core alignment position and to allow said amplification means to perform said linear amplification after the relative position approaches the core alignment position.

12. The apparatus for core alignment between optical components for adjusting relative positions between a first optical component and a second optical component according to claim 9, wherein said controlling means obtains any of an integral value and an average value in a given range of the optical intensity from said one-dimensional optical intensity distribution, and said controlling means controls said moving means to move a central position of said reciprocal scanning to a given direction being approximately perpendicular to an optical axis of the light emitted from said first optical component, and to stop movement to the given direction at any of a position where any one of said integral value and said average value becomes the maximum and a position in the vicinity thereof.

13. The apparatus for core alignment between optical components for adjusting relative positions between a first optical component and a second optical component according to claim 9, wherein said controlling means obtains any of a peak value and a given ratio width of the optical intensity from the one-dimensional optical intensity distribution, and said controlling means controls said moving means to move a central position of said reciprocal scanning to a given direction, and to stop movement to the given direction at any of a position of any one of a point where said peak value becomes maximum and a point in the vicinity thereof, and a position of any one of a point where the given ratio width becomes minimum and a point in the vicinity thereof.

14. The apparatus for core alignment between optical components for adjusting relative positions between a first optical component and a second optical component according to claim 9, wherein the light emitted from said first optical component is light to be focused on a focal point, said controlling means obtains any one of an integral value, an average value, and a peak value of optical intensity from said one-dimensional optical intensity distribution, and said controlling means controls said moving means to move a central position of said reciprocal scanning to a first direction while offsetting the central position to a second direction being approximately perpendicular to the first direction approximately coincident with a direction of an optical axis of the light emitted from said first optical component, and to stop the movement to the first direction at any of a position where any one of said integral value, said average value, and said peak value becomes minimum and a position in the vicinity thereof.

15. The apparatus for core alignment between optical components for adjusting relative positions between a first optical component and a second optical component according to claim 9, wherein said controlling means obtains any of a peak value and a given ratio width of the optical intensity from the one-dimensional optical intensity distribution, said controlling means controls said moving means to move a central position of said reciprocal scanning to a given direction approximately perpendicular to a direction of an optical axis of the light emitted from said first optical component, and to stop the movement to the given direction at any of a position where any one of said peak value and said given ratio width becomes a given value and a position in the vicinity thereof.

16. An apparatus for core alignment between optical components for adjusting relative positions between a first optical component and a second optical component, wherein said first optical component includes a plurality of regions being arranged on an approximately straight line and capable of respectively emitting light mutually parallel along an optical axis, said second optical component includes a plurality of regions being arranged on an approximately straight line and capable of respectively allowing light to be incident, the apparatus comprises:

at least two pieces of amplification means for amplifying outputs corresponding to at least two photodetectors for respectively detecting light being respectively emitted from at least two regions from the plurality of regions of said first optical component and respectively introduced to at least two corresponding regions from the plurality of regions of said second optical component;

moving means for changing the relative positions between said first and second optical components;

controlling means for controlling said moving means to adjust the relative positions based on outputs of at least the two pieces of said amplification means; and reciprocally scanning means for subjecting said first and second optical components relatively to reciprocal scanning by repeating one-dimensionally concerning one axis, said controlling means obtains one-dimensional optical intensity distribution concerning said one axis for each output respectively based on each of the outputs of at least the two pieces of said amplification means obtained in accordance with said reciprocal scanning, and said controlling means controls said moving means to adjust the relative positions between said first and second optical components based on respective pieces of said one-dimensional optical intensity distribution to reduce a variation of peak positions of the respective pieces of said one-dimensional optical intensity distribution.

17. An apparatus for core alignment between optical components for adjusting relative positions between a first optical component and a second optical component, the apparatus comprising:

amplification means for amplifying an output of a photodetector configured to detect light being emitted from said first optical component and introduced to said second optical component;

moving means for changing the relative positions between said first and second optical components in response to an operation by an operator;

reciprocally scanning means for subjecting said first and second optical components relatively to reciprocal scanning by repeating one-dimensionally concerning one axis;

means for obtaining one-dimensional optical intensity distribution concerning said one axis based on the output of said amplification means being obtained in accordance with said reciprocal scanning; and indicating means for indicating said one-dimensional optical intensity distribution to said operator.

18. The apparatus for core alignment between optical components according to claim 17, wherein said amplification means performs logarithmic amplification.

19. The apparatus for core alignment between optical components according to claim 17, wherein said amplification means selects any of logarithmic amplification and linear amplification in response to an operation by said operator.

20. An apparatus for core alignment between optical components for adjusting relative positions between a first optical component and a second optical component, wherein said first optical component includes a plurality of regions being arranged on an approximately straight line and capable of respectively emitting light mutually parallel along an optical axis, said second optical component includes a plurality of regions being arranged on an approximately straight line and capable of respectively allowing light to be incident, and the apparatus comprises:

at least two pieces of amplification means for amplifying outputs corresponding to at least two photodetectors for respectively detecting light being respectively emitted from at least two regions from the plurality of regions of said first optical component and respectively introduced to at least two corresponding regions from the plurality of regions of said second optical component;

moving means for changing the relative positions between said first and second optical components in response to an operation by an operator;

reciprocally scanning means for subjecting said first and second optical components relatively to reciprocal scanning by repeating one-dimensionally concerning one axis;

means for obtaining one-dimensional optical intensity distribution concerning said one axis for each output respectively based on each of the outputs of at least the two pieces said amplification means obtained in accordance with said reciprocal scanning; and indicating means for indicating respective pieces of said one-dimensional optical intensity distribution to said operator.

* * * * *

UNITED STATES PATENT AND TRADEMARK OFFICE
CERTIFICATE OF CORRECTION

PATENT NO. : 6,970,627 B2
APPLICATION NO. : 10/437407
DATED : November 29, 2005
INVENTOR(S) : Musubu Koishi et al.

It is certified that error appears in the above-identified patent and that said Letters Patent is hereby corrected as shown below:

On the Title Page:

On the Title Page of the patent under Item [73] Assignee, please replace "SOEI Patents, Trademark & Law, Tokyo (JP)" with --Precise Gauges Co., Ltd., Shizuoka (JP)--.

Signed and Sealed this

Twenty-fourth Day of March, 2009

JOHN DOLL
*Acting Director of the United States Patent and Trademark Office*